US008213641B2

(12) United States Patent
Faller et al.

(10) Patent No.: US 8,213,641 B2
(45) Date of Patent: Jul. 3, 2012

(54) ENHANCING AUDIO WITH REMIX CAPABILITY

(75) Inventors: Christof Faller, Chavannes-pres-Renens (CH); Hyen O. Oh, Goyang-si (KR); Yang Won Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 1310 days.

(21) Appl. No.: 11/744,156

(22) Filed: May 3, 2007

(65) Prior Publication Data

US 2008/0049943 A1 Feb. 28, 2008

Related U.S. Application Data

(60) Provisional application No. 60/829,350, filed on Oct. 13, 2006, provisional application No. 60/884,594, filed on Jan. 11, 2007, provisional application No. 60/885,742, filed on Jan. 19, 2007, provisional application No. 60/888,413, filed on Feb. 6, 2007, provisional application No. 60/894,162, filed on Mar. 9, 2007.

(30) Foreign Application Priority Data

May 4, 2006 (EP) .................................... 06113521

(51) Int. Cl.
*H04B 1/00* (2006.01)
*H04R 5/00* (2006.01)
*G06F 17/00* (2006.01)

(52) U.S. Cl. ............... 381/119; 381/22; 381/23; 700/94

(58) Field of Classification Search .................. 381/119, 381/23, 19–22, 310; 700/94; 704/500, 501
See application file for complete search history.

(56) References Cited

U.S. PATENT DOCUMENTS 5,974,380 A 10/1999 Smyth
6,026,168 A 2/2000 Li et al.
6,122,619 A 9/2000 Kolluru
6,128,597 A 10/2000 Kolluru
6,141,446 A 10/2000 Boliek
6,496,584 B2 12/2002 Irwan et al.
(Continued)

FOREIGN PATENT DOCUMENTS

CN 1487746 4/2004
(Continued)

OTHER PUBLICATIONS

Faller, C., "Coding of Spatial Audio Compatible with Different Playback Formats", Audio Engineering Society Convention Paper, New York, NY, Oct. 28, 2004.
Vera-Candeas, P., "A New Sinusoidal Modelling Approach for Parametric Speech and Audio Coding", Image and Signal Processing and Analysis, 2003.

(Continued)

*Primary Examiner* — Vivian Chin
*Assistant Examiner* — Douglas Suthers
(74) *Attorney, Agent, or Firm* — Fish & Richardson P.C.

(57) ABSTRACT

One or more attributes (e.g., pan, gain, etc.) associated with one or more objects (e.g., an instrument) of a stereo or multi-channel audio signal can be modified to provide remix capability. In some implementations, a method can include obtaining a first plural-channel audio signal having one or more objects; obtaining side information, at least some of which represents a relation between the first plural-channel audio signal and the one or more objects; obtaining a set of mix parameters; and generating a second plural-channel audio signal using the side information and the set of mix parameters.

16 Claims, 23 Drawing Sheets

U.S. PATENT DOCUMENTS

| | | | | |
|---|---|---|---|---|
| 6,584,077 | B1 | 6/2003 | Polomski | |
| 6,952,677 | B1 | 10/2005 | Absar | |
| 7,103,187 | B1 | 9/2006 | Neuman | |
| 2003/0023160 | A1 | 1/2003 | Minkoff | |
| 2003/0117759 | A1 | 6/2003 | Cooper | |
| 2003/0236583 | A1 | 12/2003 | Baumgarte et al. | |
| 2005/0089181 | A1 | 4/2005 | Polk, Jr. | |
| 2005/0157883 | A1 | 7/2005 | Herre et al. | |
| 2005/0195981 | A1 | 9/2005 | Faller et al. | |
| 2006/0009225 | A1 | 1/2006 | Herre et al. | |
| 2006/0085200 | A1 | 4/2006 | Allamanche et al. | |
| 2006/0115100 | A1 | 6/2006 | Faller | |
| 2006/0133618 | A1 | 6/2006 | Villemoes | |
| 2007/0083365 | A1 | 4/2007 | Shmunk | |
| 2008/0002842 | A1 * | 1/2008 | Neusinger et al. | 381/119 |

FOREIGN PATENT DOCUMENTS

| | | |
|---|---|---|
| EP | 00798866 | 10/1997 |
| EP | 1565036 | 8/2005 |
| EP | 1640972 | 3/2006 |
| EP | 1691348 | 8/2006 |
| EP | 1853092 | 11/2007 |
| EP | 1784819 | 4/2008 |
| JP | 08-65169 | 3/1996 |
| JP | 11-352962 | 12/1999 |
| JP | 2001-249664 | 9/2001 |
| JP | 2002-051399 | 2/2002 |
| JP | 2002-058100 | 2/2002 |
| JP | 2002-125010 | 4/2002 |
| JP | 2002-372970 | 12/2002 |
| JP | 2004-078183 | 3/2004 |
| JP | 2004170610 | 6/2004 |
| JP | 2004080735 | 9/2004 |
| JP | 2004-535145 | 11/2004 |
| JP | 2005-523480 | 8/2005 |
| JP | 2005-523624 | 8/2005 |
| JP | 2005-533426 | 11/2005 |
| JP | 2006-323408 | 11/2006 |
| JP | 2008-511848 | 4/2008 |
| JP | 2008-512708 | 4/2008 |
| KR | 20000053152 | 8/2000 |
| KR | 1020060049980 | 5/2006 |
| KR | 1020060060927 | 7/2006 |
| KR | 10-2007-0107698 | 11/2007 |
| KR | 1020060049941 | 2/2009 |
| RU | 2129336 | 4/1999 |
| RU | 2185024 | 7/2002 |
| WO | 92/12607 | 7/1992 |
| WO | 98/58450 | 12/1998 |
| WO | 03090207 | 10/2003 |
| WO | 03090208 | 10/2003 |
| WO | 2004/097794 | 11/2004 |
| WO | 2005/029467 | 3/2005 |
| WO | 2005086139 | 9/2005 |
| WO | 2006/008683 | 1/2006 |
| WO | 2006002748 | 1/2006 |
| WO | 2006/027079 | 3/2006 |
| WO | 2006/027138 | 3/2006 |
| WO | WO 2006/048226 | 5/2006 |
| WO | 2006/060278 | 6/2006 |
| WO | WO 2006/072270 | 7/2006 |
| WO | 2006/084916 | 8/2006 |
| WO | 2006084916 | 8/2006 |
| WO | WO 2006/084916 | 8/2006 |
| WO | 2006/132857 | 12/2006 |
| WO | 2007/013775 | 2/2007 |
| WO | WO 2007/080212 | 7/2007 |

OTHER PUBLICATIONS

PCT International Search Report in corresponding PCT application #PCT/EP2007/003963 dated Aug. 31, 2007, 7 pages.

Breebaart, et al.: "MPEG Spatial Audio Coding/MPEG Surround: Overview and Current Status" In: Audio Engineering Society the 119th Convention, New York, New York, Oct. 7-10, 2005, pp. 1-17. See pp. 4-6.

International Search Report in International Application No. PCT/KR2008/005291, dated Jan. 30, 2009, 3 pages.

International Search Report in International Application No. PCT/KR2007/005740, dated Feb. 27, 2008, 2 pages.

International Search Report in International Application No. PCT/KR2007/006318, dated Mar. 17, 2008, 2 pages.

International Search Report in International Application No. PCT/KR2008/000836, dated Jun. 11, 2008, 3 pages.

International Search Report in International Application No. PCT/KR2007/005014, dated Jan. 28, 2008, 2 pages.

International Search Report in International Application No. PCT/KR2007/004805, dated Feb. 11, 2008, 2 pages.

Tilman Liebchen et al., "Improved Forward-Adaptive Prediction for MPEG-4 audio lossless coding", AES 118th Convention paper, May 28-31, 2005, Barcelona, Spain.

Tilman Liebchen et al., "The MPEG-4 audio lossless coding (ALS) standard—Technology and applications", AES 119th Convention paper, Oct. 7-10, 2005, New York, USA.

Office Action, Korean Appin. No. 10-2010-7027943, dated Mar. 3, 2011, 11 pages with English translation.

Russian Patent Application, Serial No. 2008147719 dated Aug. 5, 2010 , 13 pages.

Baumgarte, F. et al., "Binaural cue coding-part I: psychoacoustic fundamentals and design principles" IEEE Transactions on Speech and Audio Processing, IEEE Service Center, New York, NY, US, Nov. 1, 2003, vol. 11, No. 6, pp. 509-519.

Office Action, Japanese Appin. No. 2009-508223, dated Nov. 22, 2010, 7 pages with English translation.

Search Report, European Appln. No. 10012979, dated Jan. 12, 2011, 5 pages.

Search Report, European Appln. No. 10012980, dated Jan. 14, 2011, 5 pages.

Christof Faller, 'Parametric coding of spatial audio' Presentee a la Faculte Informatique et Communications, Institute de Systemes de Communication, Section Des Systemes De Communication, Ecole Polytechnique Federale De Lausanne, Pour L'Obtention Du Grade De Docteur Es Sciences, These No. 3062, 2004. See Chapter 3. Parametric Coding of Spatial Audio Using Perceptual Cues, 165 pages.

International Search Report and Written Opinion for PCT/KR2008/005292, dated Sep. 8, 2008, 3 pages.

Faller, C., "Parametric Coding of Spatial Audio", Doctoral Thesis No. 3062, 2004.

Kim, J , "Lossless Wideband Audio Compression: Prediction and Transform", 2003.

Smet, P., et al., "Subband Based MPEG Audio Mixing for Internet Streaming Applications", IEEE, 2001.

Office Action from CN 200780038150.X dated Jun. 28, 2010, 15 pages (English language translation included).

European Search Report & Written Opinion for Application No. EP 07833119.6, dated Aug. 20, 2009, 6 pages.

European Search Report & Written Opinion for Application No. EP 07833324.2, dated Sep. 10, 2009, 6 pages.

Notice of Allowance dated Feb. 28, 2009 for Korean applications No. 2007-63180. (English Translation attached).

Notice of Allowance dated Feb. 28, 2009 for Korean applications Nos. 2007-63187. (English Translation attached).

Notice of Allowance dated Feb. 28, 2009 for Korean applications Nos. 2007-63292. (English Translation attached).

Notice of Allowance dated Feb. 28, 2009 for Korean applications Nos. 2007-63291 (English Translation attached).

Baumgarte and Faller, "Binaural Cue Coding-Part I: Psychoacoustic Fundamentals and Design Principles" IEEE Transactions on Speech and Audio Processing, vol. 11, No. 6, Nov. 2003, pp. 509-519.

Faller and Baumgarte, "Binaural Cue Coding-Part II: Schemes and Applications," IEEE Transactions on Speech and Audio Processing, IEEE Service Center, Oct. 6, 2003, vol. 11, No. 6, pp. 520-531.

Faller, "Parametric Multichannel Audio Coding: Synthesis of Coherence Cues," IEEE Transactions on Audio, Speech and Language Processing, vol. 14, No. 1, Jan. 2006, pp. 299-310.

Search Report, European Appln. No. 06113521.6, mailed Sep. 15, 2006, 4 pages.

* cited by examiner

ENHANCING AUDIO WITH REMIX CAPABILITY

RELATED APPLICATIONS

This application claims the benefit of priority from European Patent Application No. EP06113521, for "Enhancing Stereo Audio With Remix Capability," filed May 4, 2006, which application is incorporated by reference herein in its entirety.

This application claims the benefit of priority from U.S. Provisional Patent Application No. 60/829,350, for "Enhancing Stereo Audio With Remix Capability," filed Oct. 13, 2006, which application is incorporated by reference herein in its entirety.

This application claims the benefit of priority from U.S. Provisional Patent Application No. 60/884,594, for "Separate Dialogue Volume," filed Jan. 11, 2007, which application is incorporated by reference herein in its entirety.

This application claims the benefit of priority from U.S. Provisional Patent Application No. 60/885,742, for "Enhancing Stereo Audio With Remix Capability," filed Jan. 19, 2007, which application is incorporated by reference herein in its entirety.

This application claims the benefit of priority from U.S. Provisional Patent Application No. 60/888,413, for "Object-Based Signal Reproduction," filed Feb. 6, 2007, which application is incorporated by reference herein in its entirety.

This application claims the benefit of priority from U.S. Provisional Patent Application No. 60/894,162, for "Bitstream and Side Information For SAOC/Remix," filed Mar. 9, 2007, which application is incorporated by reference herein in its entirety.

TECHNICAL FIELD

The subject matter of this application is generally related to audio signal processing.

BACKGROUND

Many consumer audio devices (e.g., stereos, media players, mobile phones, game consoles, etc.) allow users to modify stereo audio signals using controls for equalization (e.g., bass, treble), volume, acoustic room effects, etc. These modifications, however, are applied to the entire audio signal and not to the individual audio objects (e.g., instruments) that make up the audio signal. For example, a user cannot individually modify the stereo panning or gain of guitars, drums or vocals in a song without effecting the entire song.

Techniques have been proposed that provide mixing flexibility at a decoder. These techniques rely on a Binaural Cue Coding (BCC), parametric or spatial audio decoder for generating a mixed decoder output signal. None of these techniques, however, directly encode stereo mixes (e.g., professionally mixed music) to allow backwards compatibility without compromising sound quality.

Spatial audio coding techniques have been proposed for representing stereo or multi-channel audio channels using inter-channel cues (e.g., level difference, time difference, phase difference, coherence). The inter-channel cues are transmitted as "side information" to a decoder for use in generating a multi-channel output signal. These conventional spatial audio coding techniques, however, have several deficiencies. For example, at least some of these techniques require a separate signal for each audio object to be transmitted to the decoder, even if the audio object will not be modified at the decoder. Such a requirement results in unnecessary processing at the encoder and decoder. Another deficiency is the limiting of encoder input to either a stereo (or multichannel) audio signal or an audio source signal, resulting in reduced flexibility for remixing at the decoder. Finally, at least some of these conventional techniques require complex de-correlation processing at the decoder, making such techniques unsuitable for some applications or devices.

SUMMARY

One or more attributes (e.g., pan, gain, etc.) associated with one or more objects (e.g., an instrument) of a stereo or multichannel audio signal can be modified to provide remix capability.

In some implementations, a method includes: obtaining a first plural-channel audio signal having a set of objects; obtaining side information, at least some of which represents a relation between the first plural-channel audio signal and one or more source signals representing objects to be remixed; obtaining a set of mix parameters; and generating a second plural-channel audio signal using the side information and the set of mix parameters.

In some implementations, a method includes: obtaining an audio signal having a set of objects; obtaining a subset of source signals representing a subset of the objects; and generating side information from the subset of source signals, at least some of the side information representing a relation between the audio signal and the subset of source signals.

In some implementations, a method includes: obtaining a plural-channel audio signal; determining gain factors for a set of source signals using desired source level differences representing desired sound directions of the set of source signals on a sound stage; estimating a subband power for a direct sound direction of the set of source signals using the plural-channel audio signal; and estimating subband powers for at least some of the source signals in the set of source signals by modifying the subband power for the direct sound direction as a function of the direct sound direction and a desired sound direction.

In some implementations, a method includes: obtaining a mixed audio signal; obtaining a set of mix parameters for remixing the mixed audio signal; if side information is available, remixing the mixed audio signal using the side information and the set of mix parameters; if side information is not available, generating a set of blind parameters from the mixed audio signal; and generating a remixed audio signal using the blind parameters and the set of mix parameters.

In some implementations, a method includes: obtaining a mixed audio signal including speech source signals; obtaining mix parameters specifying a desired enhancement to one or more of the speech source signals; generating a set of blind parameters from the mixed audio signal; generating parameters from the blind parameters and the mix parameters; and applying the parameters to the mixed signal to enhance the one or more speech source signals in accordance with the mix parameters.

In some implementations, a method includes: generating a user interface for receiving input specifying mix parameters; obtaining a mixing parameter through the user interface; obtaining a first audio signal including source signals; obtaining side information at least some of which represents a relation between the first audio signal and one or more source signals; and remixing the one or more source signals using the side information and the mixing parameter to generate a second audio signal.

In some implementations, a method includes: obtaining a first plural-channel audio signal having a set of objects; obtaining side information at least some of which represents a relation between the first plural-channel audio signal and one or more source signals representing a subset of objects to be remixed; obtaining a set of mix parameters; and generating a second plural-channel audio signal using the side information and the set of mix parameters.

In some implementations, a method includes: obtaining a mixed audio signal; obtaining a set of mix parameters for remixing the mixed audio signal; generating remix parameters using the mixed audio signal and the set of mixing parameters; and generating a remixed audio signal by applying the remix parameters to the mixed audio signal using an n by n matrix.

Other implementations are disclosed for enhancing audio with remixing capability, including implementations directed to systems, methods, apparatuses, computer-readable mediums and user interfaces.

DETAILED DESCRIPTION

I. Remixing Stereo Signals

Figure 1A:
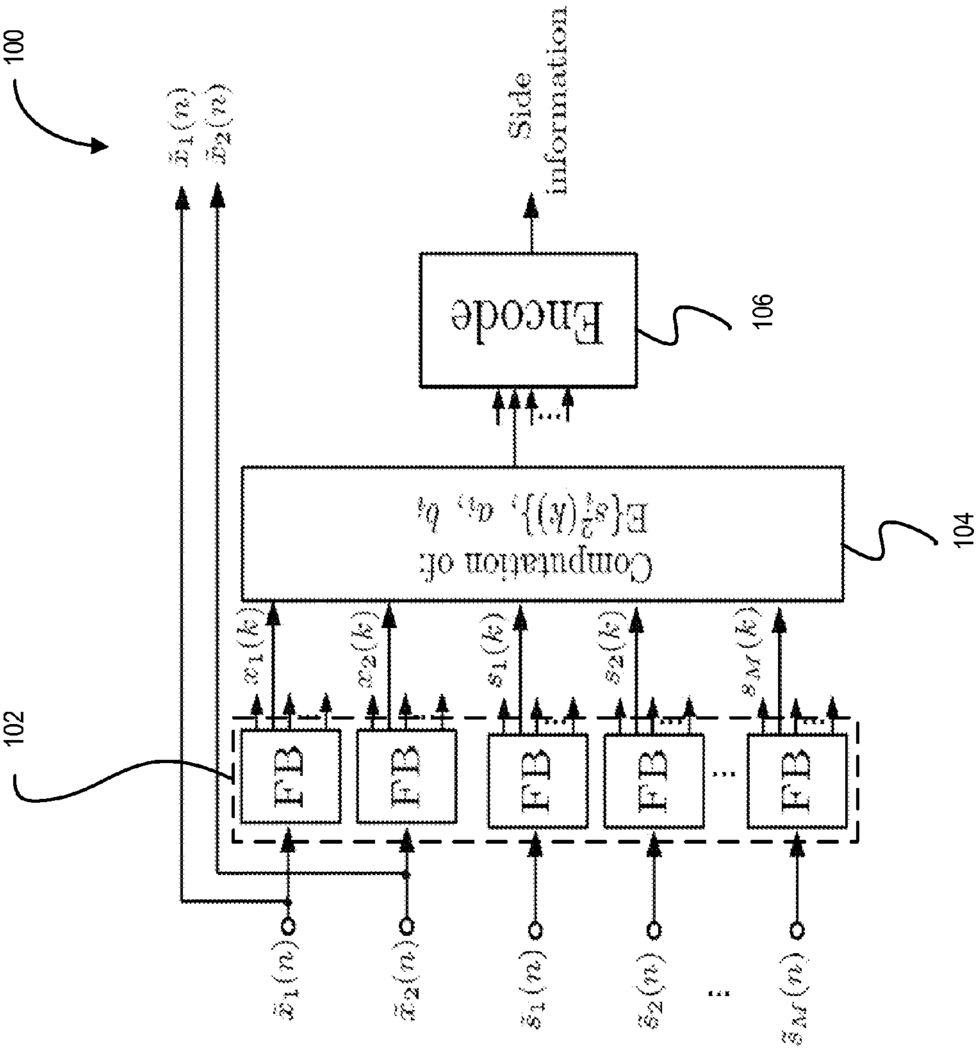
FIG. 1A is a block diagram of an implementation of an encoding system for encoding a stereo signal plus M source signals corresponding to objects to be remixed at a decoder.

FIG. 1A is a block diagram of an implementation of an encoding system 100 for encoding a stereo signal plus M source signals corresponding to objects to be remixed at a decoder. In some implementations, the encoding system 100 generally includes a filter bank array 102, a side information generator 104 and an encoder 106.

A. Original and Desired Remixed Signal

The two channels of a time discrete stereo audio signal are denoted and $\tilde{x}_1(n)$ $\tilde{x}_2(n)$ where n is a time index. It is assumed that the stereo signal can be represented as $$\tilde{x}_1(n) = \sum_{i=1}^{I} a_i \tilde{s}_i(n) \tag{1}$$

$$\tilde{x}_2(n) = \sum_{i=1}^{I} b_i \tilde{s}_i(n),$$

where I is the number of source signals (e.g., instruments) which are contained in the stereo signal (e.g., MP3) and $\tilde{s}_i(n)$ are the source signals. The factors $a_i$ and $b_i$ determine the gain and amplitude panning for each source signal. It is assumed that all the source signals are mutually independent. The source signals may not all be pure source signals. Rather, some of the source signals may contain reverberation and/or other sound effect signal components. In some implementations, delays, $d_i$, can be introduced into the original mix audio signal in [1] to facilitate time alignment with remix parameters:

$$\tilde{x}_1(n) = \sum_{i=1}^{I} a_i \tilde{s}_i(n - d_i) \tag{1.1}$$

$$\tilde{x}_2(n) = \sum_{i=1}^{I} b_i \tilde{s}_i(n - d_i).$$

In some implementations, the encoding system 100 provides or generates information (hereinafter also referred to as "side information") for modifying an original stereo audio signal (hereinafter also referred to as "stereo signal") such that M source signals are "remixed" into the stereo signal with different gain factors. The desired modified stereo signal can be represented as $$\tilde{y}_1(n) = \sum_{i=1}^{M} c_i \tilde{s}_i(n) + \sum_{i=M+1}^{I} a_i \tilde{s}_i(n) \tag{2}$$

$$\tilde{y}_2(n) = \sum_{i=1}^{M} d_i \tilde{s}_i(n) + \sum_{i=M+1}^{I} b_i \tilde{s}_i(n),$$

where $c_i$ and $d_i$ are new gain factors (hereinafter also referred to as "mixing gains" or "mix parameters") for the M source signals to be remixed (i.e., source signals with indices 1, 2, . . . , M).

A goal of the encoding system 100 is to provide or generate information for remixing a stereo signal given only the original stereo signal and a small amount of side information (e.g., small compared to the information contained in the stereo signal waveform). The side information provided or generated by the encoding system 100 can be used in a decoder to perceptually mimic the desired modified stereo signal of [2] given the original stereo signal of [1]. With the encoding system 100, the side information generator 104 generates side information for remixing the original stereo signal, and a decoder system 300 (FIG. 3A) generates the desired remixed stereo audio signal using the side information and the original stereo signal.

B. Encoder Processing

Referring again to FIG. 1A, the original stereo signal and M source signals are provided as input into the filterbank array 102. The original stereo signal is also output directly from the encoder 102. In some implementations, the stereo signal output directly from the encoder 102 can be delayed to synchronize with the side information bitstream. In other implementations, the stereo signal output can be synchronized with the side information at the decoder. In some implementations, the encoding system 100 adapts to signal statistics as a function of time and frequency. Thus, for analysis and synthesis, the stereo signal and M source signals are processed in a time-frequency representation, as described in reference to FIGS. 4 and 5.

Figure 1B:
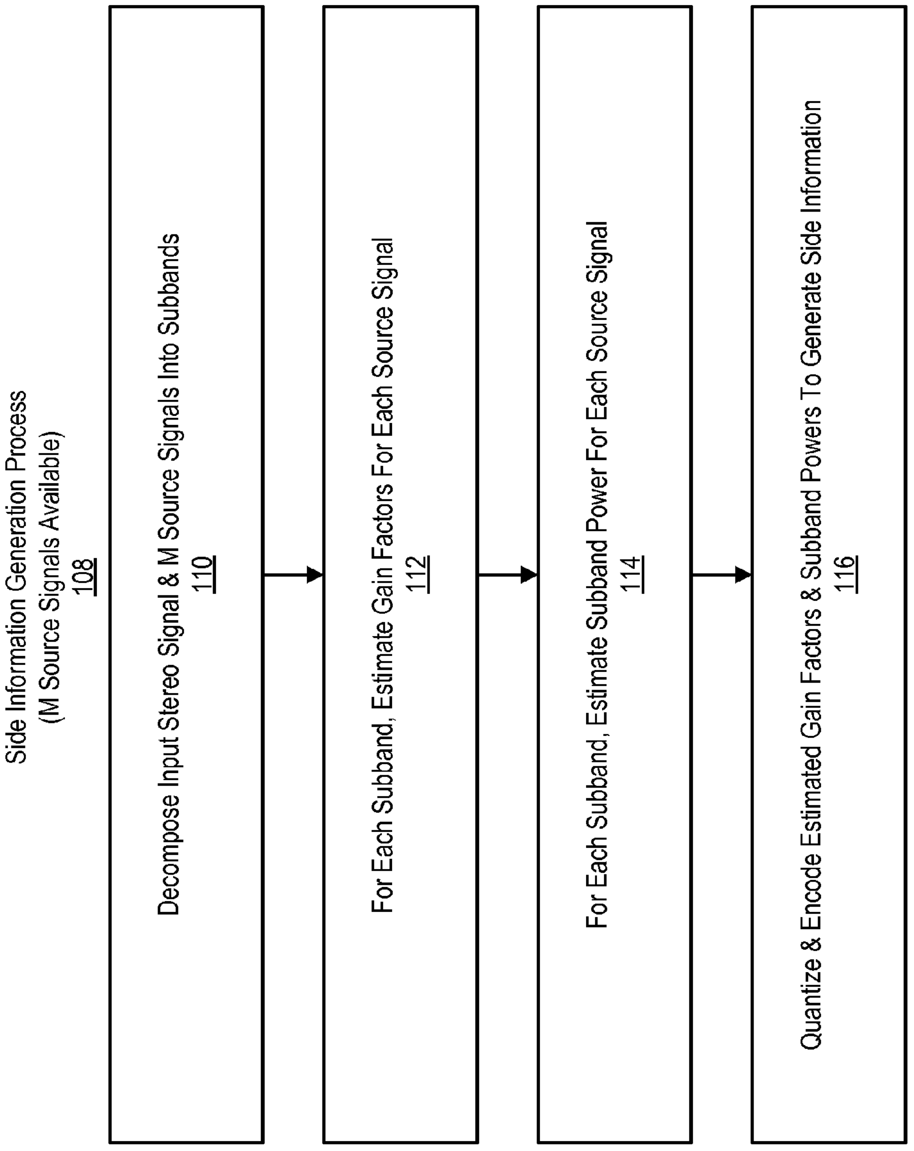
FIG. 1B is a flow diagram of an implementation of a process for encoding a stereo signal plus M source signals corresponding to objects to be remixed at a decoder.

FIG. 1B is a flow diagram of an implementation of a process 108 for encoding a stereo signal plus M source signals corresponding to objects to be remixed at a decoder. An input stereo signal and M source signals are decomposed into subbands (110). In some implementations, the decomposition is implemented with a filterbank array. For each subband, gain factors are estimated for the M source signals (112), as described more fully below. For each subband, short-time power estimates are computed for the M source signals (114), as described below. The estimated gain factors and subband powers can be quantized and encoded to generate side information (116).

Figure 2:
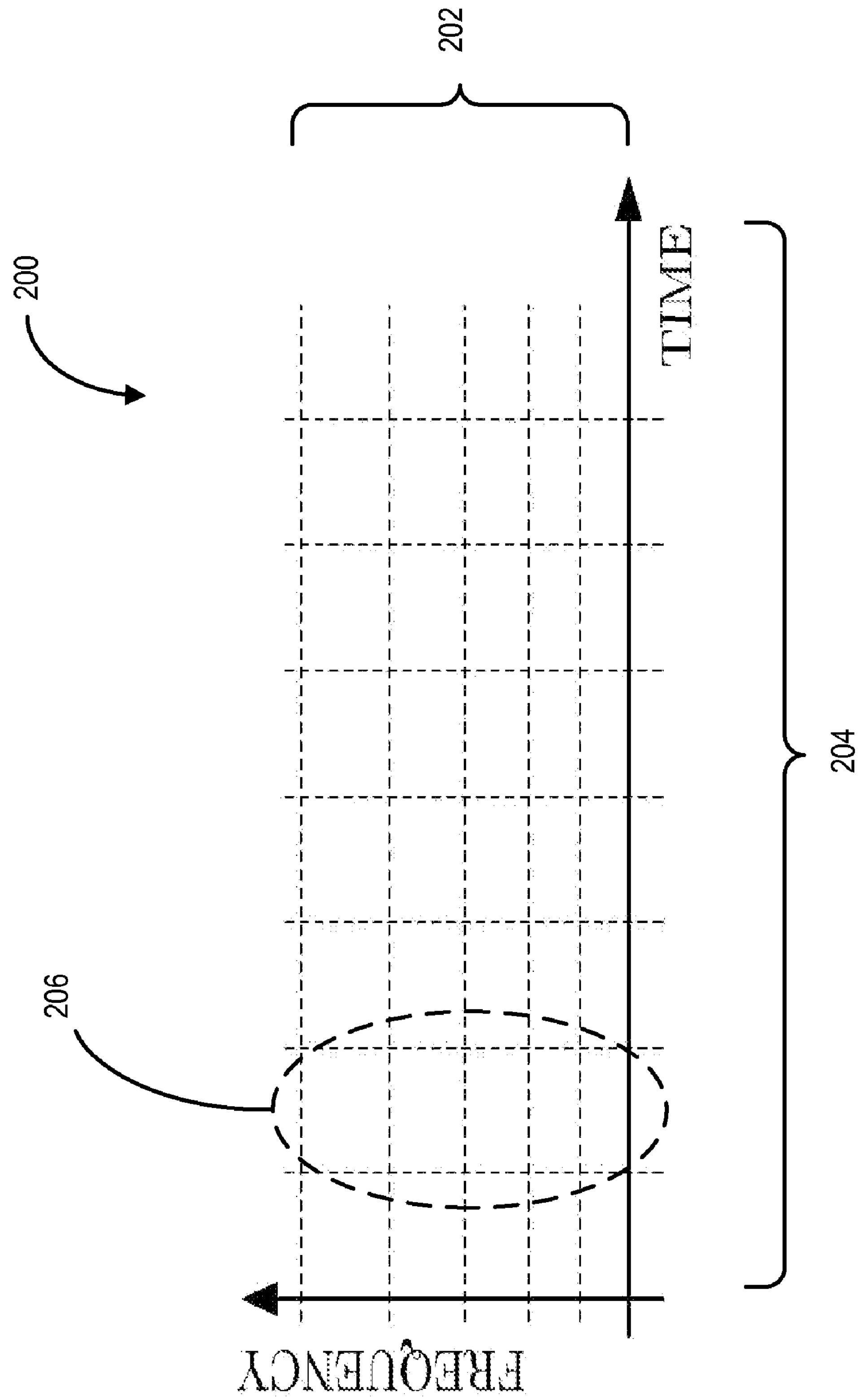
FIG. 2 illustrates a time-frequency graphical representation for analyzing and processing a stereo signal and M source signals.

FIG. 2 illustrates a time-frequency graphical representation 200 for analyzing and processing a stereo signal and M source signals. The y-axis of the graph represents frequency and is divided into multiple non-uniform subbands 202. The x-axis represents time and is divided into time slots 204. Each of the dashed boxes in FIG. 2 represents a respective subband and time slot pair. Thus, for a given time slot 204 one or more subbands 202 corresponding to the time slot 204 can be processed as a group 206. In some implementations, the widths of the subbands 202 are chosen based on perception limitations associated with a human auditory system, as described in reference to FIGS. 4 and 5.

In some implementations, an input stereo signal and M input source signals are decomposed by the filterbank array 102 into a number of subbands 202. The subbands 202 at each center frequency can be processed similarly. A subband pair of the stereo audio input signals, at a specific frequency, is denoted $x_1(k)$ and $x_2(k)$, where k is the down sampled time index of the subband signals. Similarly, the corresponding subband signals of the M input source signals are denoted $s_1(k)$, $s_2(k)$, . . . , $S_M(k)$. Note that for simplicity of notation, indexes for the subbands have been omitted in this example. With respect to downsampling, subband signals with a lower sampling rate may be used for efficiency. Usually filterbanks and the STFT effectively have sub-sampled signals (or spectral coefficients).

In some implementations, the side information necessary for remixing a source signal with index i includes the gain factors $a_i$ and $b_i$, and in each subband, an estimate of the power of the subband signal as a function of time, $E\{s_i^2(k)\}$. The gain factors $a_i$ and $b_i$, can be given (if this knowledge of the stereo signal is known) or estimated. For many stereo signals, $a_i$ and $b_i$ are static. If $a_i$ or $b_i$ are varying as a function of time k, these gain factors can be estimated as a function of time. It is not necessary to use an average or estimate of the subband power to generate side information. Rather, in some implementations, the actual subband power $S_i^2$ can be used as a power estimate.

In some implementations, a short-time subband power can be estimated using single-pole averaging, where $E\{s_i^2(k)\}$ can be computed as $$E\{s_i^2(k)\} = \alpha s_i^2(k) + (1-\alpha)E\{s_i^2(k-1)\}, \tag{3}$$

, where $\alpha \epsilon [0,1]$ determines a time-constant of an exponentially decaying estimation window, $$T = \frac{1}{\alpha f_s}, \tag{4}$$

and $f_s$ denotes a subband sampling frequency. A suitable value for T can be, for example, 40 milliseconds. In the following equations, E{.} generally denotes short-time averaging.

In some implementations, some or all of the side information $a_i$, $b_i$ and $E\{s_i^2(k)\}$, may be provided on the same media as the stereo signal. For example, a music publisher, recording studio, recording artist or the like, may provide the side information with the corresponding stereo signal on a compact disc (CD), digital Video Disk (DVD), flash drive, etc. In some implementations, some or all of the side information can be provided over a network (e.g., Internet, Ethernet, wireless network) by embedding the side information in the bitstream of the stereo signal or transmitting the side information in a separate bitstream.

If $a_i$ and $b_i$ are not given, then these factors can be estimated. Since, $E\{\tilde{s}_i(n)\tilde{x}_1(n)\}=a_iE\{\tilde{s}_i^2(n)\}$, $a_i$ can be computed as $$a_i = \frac{E\{\tilde{s}_i(n)\tilde{x}_1(n)\}}{E\{\tilde{s}_i^2(n)\}}. \quad (5)$$

Similarly, $b_i$ can be computed as $$b_i = \frac{E\{\tilde{s}_i(n)\tilde{x}_2(n)\}}{E\{\tilde{s}_i^2(n)\}}. \quad (6)$$

If $a_i$ and $b_i$ are adaptive in time, the E{.} operator represents a short-time averaging operation. On the other hand, if the gain factors $a_i$ and $b_i$ are static, the gain factors can be computed by considering the stereo audio signals in their entirety. In some implementations, the gain factors $a_i$ and $b_i$ can be estimated independently for each subband. Note that in [5] and [6] the source signals $s_i$ are independent, but, in general, not a source signal $s_i$ and stereo channels $x_1$ and $x_2$, since $s_i$ is contained in the stereo channels $x_1$ and $x_2$.

In some implementations, the short-time power estimates and gain factors for each subband are quantized and encoded by the encoder 106 to form side information (e.g., a low bit rate bitstream). Note that these values may not be quantized and coded directly, but first may be converted to other values more suitable for quantization and coding, as described in reference to FIGS. 4 and 5. In some implementations, $E\{s_i^2(k)\}$ can be normalized relative to the subband power of the input stereo audio signal, making the encoding system 100 robust relative to changes when a conventional audio coder is used to efficiently code the stereo audio signal, as described in reference to FIGS. 6-7.

C. Decoder Processing

Figure 3A:
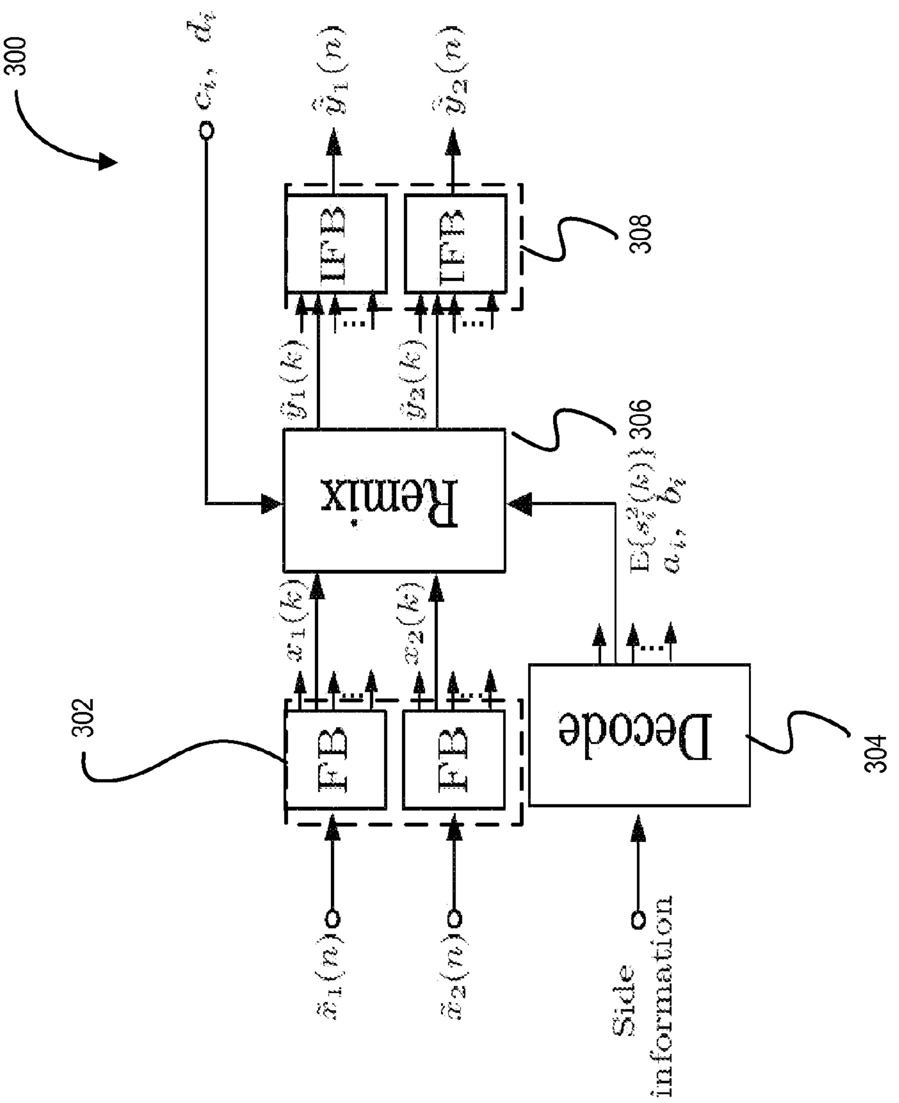
FIG. 3A is a block diagram of an implementation of a remixing system for estimating a remixed stereo signal using an original stereo signal plus side information.

FIG. 3A is a block diagram of an implementation of a remixing system 300 for estimating a remixed stereo signal using an original stereo signal plus side information. In some implementations, the remixing system 300 generally includes a filterbank array 302, a decoder 304, a remix module 306 and an inverse filterbank array 308.

The estimation of the remixed stereo audio signal can be carried out independently in a number of subbands. The side information includes the subband power, $E\{s_i^2(k)\}$ and the gain factors, $a_i$ and $b_i$, with which the M source signals are contained in the stereo signal. The new gain factors or mixing gains of the desired remixed stereo signal are represented by $c_i$ and $d_i$. The mixing gains $c_i$ and $d_i$ can be specified by a user through a user interface of an audio device, such as described in reference to FIG. 12.

In some implementations, the input stereo signal is decomposed into subbands by the filterbank array 302, where a subband pair at a specific frequency is denoted $x_1(k)$ and $x_2(k)$. As illustrated in FIG. 3A, the side information is decoded by the decoder 304, yielding for each of the M source signals to be remixed, the gain factors $a_i$ and $b_i$, which are contained in the input stereo signal, and for each subband, a power estimate, $E\{s_i^2(k)\}$. The decoding of side information is described in more detail in reference to FIGS. 4 and 5.

Given the side information, the corresponding subband pair of the remixed stereo audio signal, can be estimated by the remix module 306 as a function of the mixing gains, $c_i$ and $d_i$, of the remixed stereo signal. The inverse filterbank array 308 is applied to the estimated subband pairs to provide a remixed time domain stereo signal.

Figure 3B:
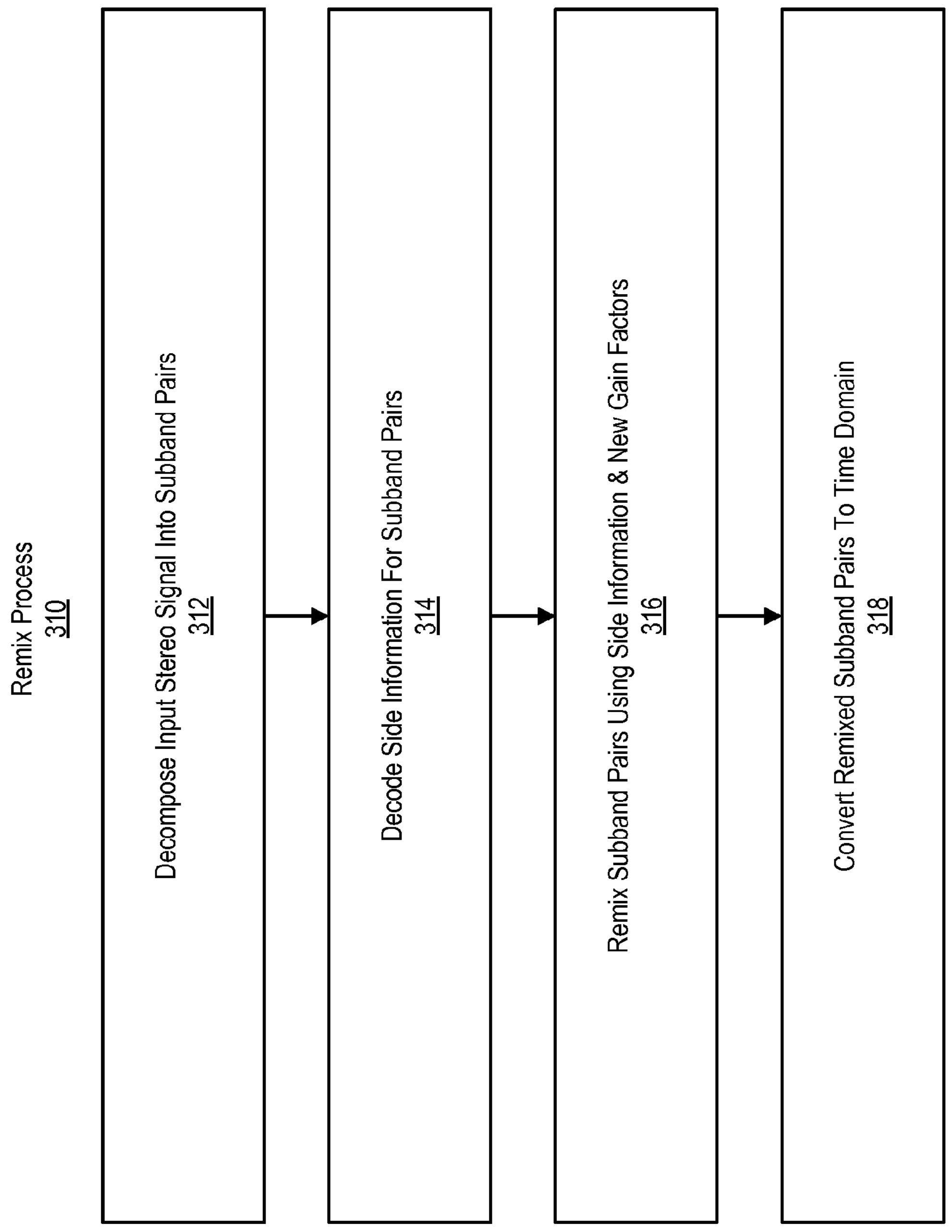
FIG. 3B is a flow diagram of an implementation of a process for estimating a remixed stereo signal using the remix system of FIG. 3A.

FIG. 3B is a flow diagram of an implementation of a remix process 310 for estimating a remixed stereo signal using the remixing system of FIG. 3A. An input stereo signal is decomposed into subband pairs (312). Side information is decoded for the subband pairs (314). The subband pairs are remixed using the side information and mixing gains (316). The remixed subband pairs are converted to time domain (318). In some implementations, the mixing gains are provided by a user, as described in reference to FIG. 12. Alternatively, the mixing gains can be provided programmatically by an application, operating system or the like. The mixing gains can also be provided over a network (e.g., the Internet, Ethernet, wireless network), as described in reference to FIG. 11.

D. The Remixing Process

In some implementations, the remixed stereo signal can be approximated in a mathematical sense using least squares estimation. Optionally, perceptual considerations can be used to modify the estimate.

Equations [1] and [2] also hold for the subband pairs $x_1(k)$ and $x_2(k)$, and $y_1(k)$ and $y_2(k)$, respectively. In this case, the source signals are replaced with source subband signals, $s_i(k)$.

A subband pair of the stereo signal is given by $$x_1(k) = \sum_{i=1}^{I} a_i s_i(k) \qquad (7)$$
$$x_2(k) = \sum_{i=1}^{I} b_i s_i(k),$$

, and a subband pair of the remixed stereo audio signal is $$y_1(k) = \sum_{i=1}^{M} c_i s_i(k) + \sum_{i=M+1}^{I} a_i s_i(k) \qquad (8)$$
$$y_2(k) = \sum_{i=1}^{M} d_i s_i(k) + \sum_{i=M+1}^{I} b_i s_i(k),$$

Given a subband pair of the original stereo signal, $x_1(k)$ and $x_2(k)$, the subband pair of the stereo signal with different gains is estimated as a linear combination of the original left and right stereo subband pair, $$\hat{y}_1(k)=w_{11}(k)x_1(k)+w_{12}(k)x_2(k)$$
$$\hat{y}_2(k)=w_{21}(k)x_1(k)+w_{22}(k)x_2(k), \qquad (9)$$

where $w_{11}(k)$, $w_{12}(k)$, $w_{21}(k)$ and $w_{22}(k)$ are real valued weighting factors. The estimation error is defined as $$\begin{aligned} e_1(k) &= y_1(k) - \hat{y}_1(k) \qquad (10)\\ &= y_1(k) - w_{11}(k)x_1(k) - w_{12}x_2(k),\\ &= y_2(k) - w_{21}(k)x_1(k) - w_{22}x_2(k).\\ e_2(k) &= y_2(k) - \hat{y}_2(k) \end{aligned}$$

The weights $w_{11}(k)$, $w_{12}(k)$, $w_{21}(k)$ and $w_{22}(k)$ can be computed, at each time k for the subbands at each frequency, such that the mean square errors, $E\{e_1^2(k)\}$ and $E\{e_2^2(k)\}$, are minimized. For computing $w_{11}(k)$ and $w_{12}(k)$, we note that $E\{e_1^2(k)\}$ is minimized when the error $e_1(k)$ is orthogonal to $x_1(k)$ and $x_2(k)$, that is $$E\{(y_1-w_{11}x_1-w_{12}x_2)x_1\}=0$$

$$E\{(y_1-w_{11}x_1-w_{12}x_2)x_2\}=0. \quad (11)$$

Note that for convenience of notation the time index k was omitted.

Re-writing these equations yields $$E\{x_1^2\}w_{11}+E\{x_1x_2\}w_{12}=E\{x_1y_1\},$$

$$E\{x_1x_2\}w_{11}+E\{x_2^2\}w_{12}=E\{x_2y_1\}. \quad (12)$$

The gain factors are the solution of this linear equation system:

$$w_{11}=\frac{E\{x_2^2\}E\{x_1y_1\}-E\{x_1x_2\}E\{x_2y_1\}}{E\{x_1^2\}E\{x_2^2\}-E^2\{x_1x_2\}}, \quad (13)$$

$$w_{12}=\frac{E\{x_1x_2\}E\{x_1y_1\}-E\{x_1^2\}E\{x_2y_1\}}{E^2\{x_1x_2\}-E^2\{x_1^2\}E\{x_2^2\}}.$$

While $E\{x_1^2\}$, $E\{x_2^2\}$ and $E\{x_1x_2\}$ can directly be estimated given the decoder input stereo signal subband pair, $E\{x_1y_1\}$ and $E\{x_2y_2\}$ can be estimated using the side information ($E\{s_1^2\}$, $a_i$, $b_i$) and the mixing gains, $c_i$ and $d_i$, of the desired remixed stereo signal:

$$E\{x_1y_1\}=E\{x_1^2\}+\sum_{i=1}^{M}a_i(c_i-a_i)E\{s_i^2\}, \quad (14)$$

$$E\{x_2y_1\}=E\{x_1x_2\}+\sum_{i=1}^{M}b_i(c_i-a_i)E\{s_i^2\}.$$

Similarly, $w_{21}$ and $w_{22}$ are computed, resulting in $$w_{21}=\frac{E\{x_2^2\}E\{x_1y_2\}-E\{x_1x_2\}E\{x_2y_2\}}{E\{x_1^2\}E\{x_2^2\}-E^2\{x_1x_2\}}, \quad (15)$$

$$w_{22}=\frac{E\{x_1x_2\}E\{x_1y_2\}-E\{x_1^2\}E\{x_2y_2\}}{E^2\{x_1x_2\}E\{x_2^2\}-E\{x_1^2\}E\{x_2^2\}}.$$

$$E\{x_2y_2\}=E\{x_2^2\}+\sum_{i=1}^{M}b_i(d_i-b_i)E\{s_i^2\}. \quad (16)$$

$$E\{x_1y_2\}=E\{x_1x_2\}+\sum_{i=1}^{M}a_i(d_i-b_i)E\{s_i^2\},$$

with

When the left and right subband signals are coherent or nearly coherent, i.e., when $$\phi=\frac{E\{x_1x_2\}}{\sqrt{E\{x_1^2\}E\{x_2^2\}}} \quad (7)$$

is close to one, then the solution for the weights is non-unique or ill-conditioned. Thus, if $\phi$ is larger than a certain threshold (e.g., 0.95), then the weights are computed by, for example, $$w_{11}=\frac{E(x_1y_1\}}{E\{x_1^2\}}, \quad (18)$$

-continued $$w_{12}=w_{21}=0,$$

$$w_{22}=\frac{E(x_1y_2\}}{E\{x_2^2\}}.$$

Under the assumption $\phi=1$, equation [18] is one of the non-unique solutions satisfying [12] and the similar orthogonality equation system for the other two weights. Note that the coherence in [17] is used to judge how similar $x_1$ and $x_2$ are to each other. If the coherence is zero, then $x_1$ and $x_2$ are independent. If the coherence is one, then $x_1$ and $x_2$ are similar (but may have different levels). If $x_1$ and $x_2$ are very similar (coherence close to one), then the two channel Wiener computation (four weights computation) is ill-conditioned. An example range for the threshold is about 0.4 to about 1.0.

The resulting remixed stereo signal, obtained by converting the computed subband signals to the time domain, sounds similar to a stereo signal that would truly be mixed with different mixing gains, $c_i$ and $d_i$, (in the following this signal is denoted "desired signal"). On one hand, mathematically, this requires that the computed subband signals are similar to the truly differently mixed subband signals. This is the case to a certain degree. Since the estimation is carried out in a perceptually motivated subband domain, the requirement for similarity is less strong. As long as the perceptually relevant localization cues (e.g., level difference and coherence cues) are sufficiently similar, the computed remixed stereo signal will sound similar to the desired signal.

E. Optional: Adjusting of Level Difference Cues

In some implementations, if the processing described herein is used, good results can be obtained. Nevertheless, to be sure that the important level difference localization cues closely approximate the level difference cues of the desired signal, post-scaling of the subbands can be applied to "adjust" the level difference cues to make sure that they match the level difference cues of the desired signal.

For the modification of the least squares subband signal estimates in [9], the subband power is considered. If the subband power is correct then the important spatial cue level difference also will be correct. The desired signal [8] left subband power is $$E[y_1^2\}=E\{x_1^2\}+\sum_{i=1}^{M}(c_i^2-a_i^2)E\{s_i^2\} \quad (19)$$

and the subband power of the estimate from [9] is $$\begin{aligned}E\{\hat{y}_1^2\}&=E\{(w_{11}x_1+w_{12}x_2)^2\} \quad (20)\\&=w_{11}^2E\{x_1^2\}+2w_{11}w_{12}E\{x_1x_2\}+w_{12}^2E\{x_2^2\}.\end{aligned}$$

Thus, for $\hat{y}_1(k)$ to have the same power as $y_1(k)$ it has to be multiplied with $$g_1=\sqrt{\frac{E\{x_1^2\}+\sum_{i=1}^{M}(c_i^2-a_i^2)E\{s_i^2\}}{w_{11}^2E\{x_1^2\}+2w_{11}w_{12}E\{x_1x_2\}+w_{12}^2E\{x_2^2\}}}. \quad (21)$$

Similarly, $\hat{y}_2(k)$ is multiplied with $$g_2 = \sqrt{\frac{E\{x_2^2\} + \sum_{i=1}^{M}(d_i^2 - b_i^2)E\{s_i^2\}}{w_{21}^2 E\{x_1^2\} + 2w_{21}w_{22}E\{x_1x_2\} + w_{22}^2 E\{x_2^2\}}} \tag{22}$$

to have the same power as the desired subband signal $y_2(k)$.

II. Quantization and Coding of the Side Information

A. Encoding

As described in the previous section, the side information necessary for remixing a source signal with index i are the factors $a_i$ and $b_i$, and in each subband the power as a function of time, $E\{s_1^2(k)\}$. In some implementations, corresponding gain and level difference values for the gain factors $a_i$ and $b_i$ can be computed in dB as follows:

$$g_i = 10\log_{10}(a_i^2 + b_i^2), \tag{23}$$

$$l_i = 20\log_{10}\frac{b_i}{a_i}.$$

In some implementations, the gain and level difference values are quantized and Huffman coded. For example, a uniform quantizer with a 2 dB quantizer step size and a one dimensional Huffman coder can be used for quantizing and coding, respectively. Other known quantizers and coders can also be used (e.g., vector quantizer).

If $a_i$ and $b_i$ are time invariant, and one assumes that the side information arrives at the decoder reliably, the corresponding coded values need only be transmitted once. Otherwise, $a_i$ and $b_i$ can be transmitted at regular time intervals or in response to a trigger event (e.g., whenever the coded values change).

To be robust against scaling of the stereo signal and power loss/gain due to coding of the stereo signal, in some implementations the subband power $E\{s_i^2(k)\}$ is not directly coded as side information. Rather, a measure defined relative to the stereo signal can be used:

$$A_i(k) = 10\log_{10}\frac{E\{s_i^2(k)\}}{E\{x_1^2(k)\} + E\{x_2^2(k)\}}. \tag{24}$$

It can be advantageous to use the same estimation windows/time-constants for computing $E\{.\}$ for the various signals. An advantage of defining the side information as a relative power value [24] is that at the decoder a different estimation window/time-constant than at the encoder may be used, if desired. Also, the effect of time misalignment between the side information and stereo signal is reduced compared to the case when the source power would be transmitted as an absolute value. For quantizing and coding $A_i(k)$, in some implementations a uniform quantizer is used with a step size of, for example, 2 dB and a one dimensional Huffman coder. The resulting bitrate may be as little as about 3 kb/s (kilobit per second) per audio object that is to be remixed.

In some implementations, bitrate can be reduced when an input source signal corresponding to an object to be remixed at the decoder is silent. A coding mode of the encoder can detect the silent object, and then transmit to the decoder information (e.g., a single bit per frame) for indicating that the object is silent.

B. Decoding

Given the Huffman decoded (quantized) values [23] and [24], the values needed for remixing can be computed as follows:

$$\tilde{a}_i = \frac{10^{\frac{\hat{g}_i}{20}}}{\sqrt{1 + 10^{\frac{\hat{l}_i}{10}}}}, \tag{25}$$

$$\tilde{b}_i = \frac{10^{\frac{\hat{g}_i + \hat{l}_i}{20}}}{\sqrt{1 + 10^{\frac{\hat{l}_i}{10}}}},$$

$$\hat{E}\{s_i^2(k)\} = 10^{\frac{\hat{A}_i(k)}{10}}\{E\{x_1^2(k)\} + E\{x_2^2(k)\}\}.$$

III. Implementation Details

A. Time-Frequency Processing

In some implementations, STFT (short-term Fourier transform) based processing is used for the encoding/decoding systems described in reference to FIGS. 1-3. Other time-frequency transforms may be used to achieve a desired result, including but not limited to, a quadrature mirror filter (QMF) filterbank, a modified discrete cosine transform (MDCT), a wavelet filterbank, etc.

For analysis processing (e.g., a forward filterbank operation), in some implementations a frame of N samples can be multiplied with a window before an N-point discrete Fourier transform (DFT) or fast Fourier transform (FFT) is applied. In some implementations, the following sine window can be used:

$$w_a(l) = \begin{cases} \sin\left(\frac{n\pi}{N}\right) & \text{for } 0 \le n < N \\ 0 & \text{otherwise.} \end{cases} \tag{26}$$

If the processing block size is different than the DFT/FFT size, then in some implementations zero padding can be used to effectively have a smaller window than N. The described analysis processing can, for example, be repeated every N/2 samples (equals window hop size), resulting in a 50 percent window overlap. Other window functions and percentage overlap can be used to achieve a desired result.

To transform from the STFT spectral domain to the time domain, an inverse DFT or FFT can be applied to the spectra. The resulting signal is multiplied again with the window described in [26], and adjacent signal blocks resulting from multiplication with the window are combined with overlap added to obtain a continuous time domain signal.

In some cases, the uniform spectral resolution of the STFT may not be well adapted to human perception. In such cases, as opposed to processing each STFT frequency coefficient individually, the STFT coefficients can be "grouped," such that one group has a bandwidth of approximately two times the equivalent rectangular bandwidth (ERB), which is a suitable frequency resolution for spatial audio processing.

Figure 4:
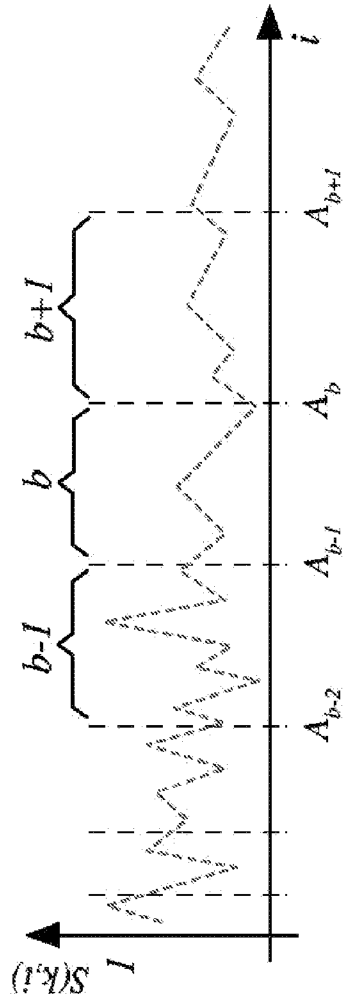
FIG. 4 illustrates indices i of short-time Fourier transform (STFT) coefficients belonging to a partition with index b.

FIG. 4 illustrates indices i of STFT coefficients belonging to a partition with index b. In some implementations, only the first N/2+1 spectral coefficients of the spectrum are considered because the spectrum is symmetric. The indices of the STFT coefficients which belong to the partition with index b $(1 \leqq b \leqq B)$ are $i \in \{A_{b-1}, A_{b-1}+1, \ldots A_b\}$ with $A_0=0$, as illustrated in FIG. 4. The signals represented by the spectral coefficients of the partitions correspond to the perceptually motivated subband decomposition used by the encoding system. Thus, within each such partition the described processing is jointly applied to the STFT coefficients within the partition.

Figure 5:
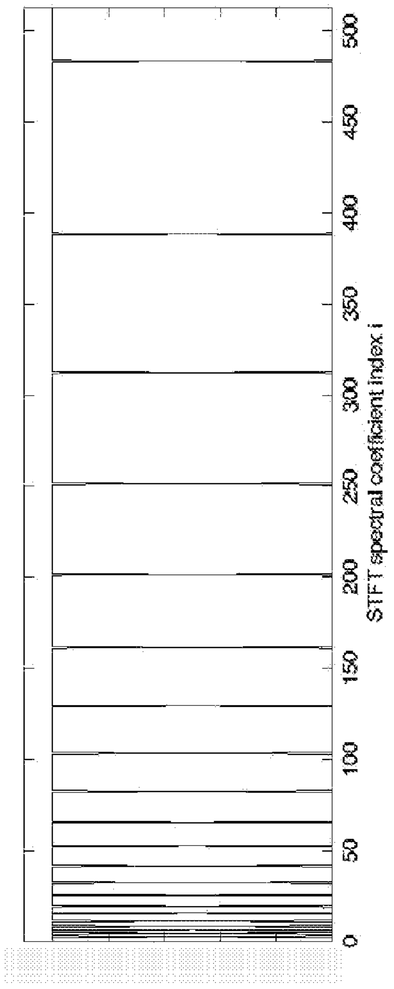
FIG. 5 illustrates grouping of spectral coefficients of a uniform STFT spectrum to mimic a non-uniform frequency resolution of a human auditory system.

FIG. 5 exemplarily illustrates grouping of spectral coefficients of a uniform STFT spectrum to mimic a non-uniform frequency resolution of a human auditory system. In FIG. 5, N=1024 for a sampling rate of 44.1 kHz and the number of partitions, B=20, with each partition having a bandwidth of approximately 2 ERB. Note that the last partition is smaller than two ERB due to the cutoff at the Nyquist frequency.

B. Estimation of Statistical Data

Given two STFT coefficients, $x_i(k)$ and $x_j(k)$, the values $E\{x_i(k)x_j(k)\}$, needed for computing the remixed stereo audio signal can be estimated iteratively. In this case, the subband sampling frequency $f_s$ is the temporal frequency at which STFT spectra are computed. To get estimates for each perceptual partition (not for each STFT coefficient), the estimated values can be averaged within the partitions before being further used.

The processing described in the previous sections can be applied to each partition as if it were one subband. Smoothing between partitions can be accomplished using, for example, overlapping spectral windows, to avoid abrupt processing changes in frequency, thus reducing artifacts.

C. Combination with Conventional Audio Coders

Figure 6A:
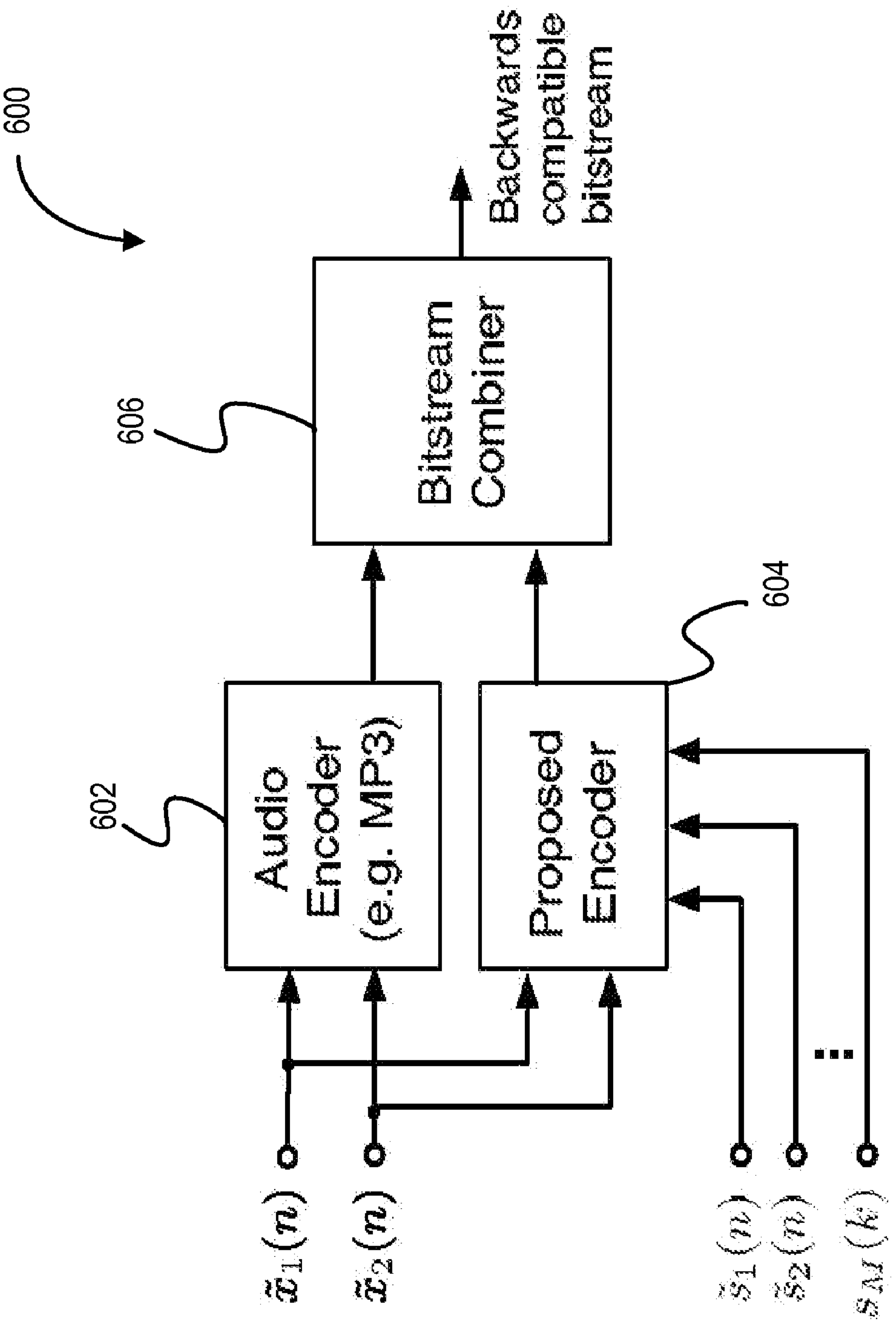
FIG. 6A is a block diagram of an implementation of the encoding system of FIG. 1 combined with a conventional stereo audio encoder.

FIG. 6A is a block diagram of an implementation of the encoding system 100 of FIG. 1A combined with a conventional stereo audio encoder. In some implementations, a combined encoding system 600 includes a conventional audio encoder 602, a proposed encoder 604 (e.g., encoding system 100) and a bitstream combiner 606. In the example shown, stereo audio input signals are encoded by the conventional audio encoder 602 (e.g., MP3, AAC, MPEG surround, etc.) and analyzed by the proposed encoder 604 to provide side information, as previously described in reference to FIGS. 1-5. The two resulting bitstreams are combined by the bitstream combiner 606 to provide a backwards compatible bitstream. In some implementations, combining the resulting bitstreams includes embedding low bitrate side information (e.g., gain factors $a_i$, $b_i$ and subband power $E\{s_i^2(k)\}$) into the backward compatible bitstream.

Figure 6B:
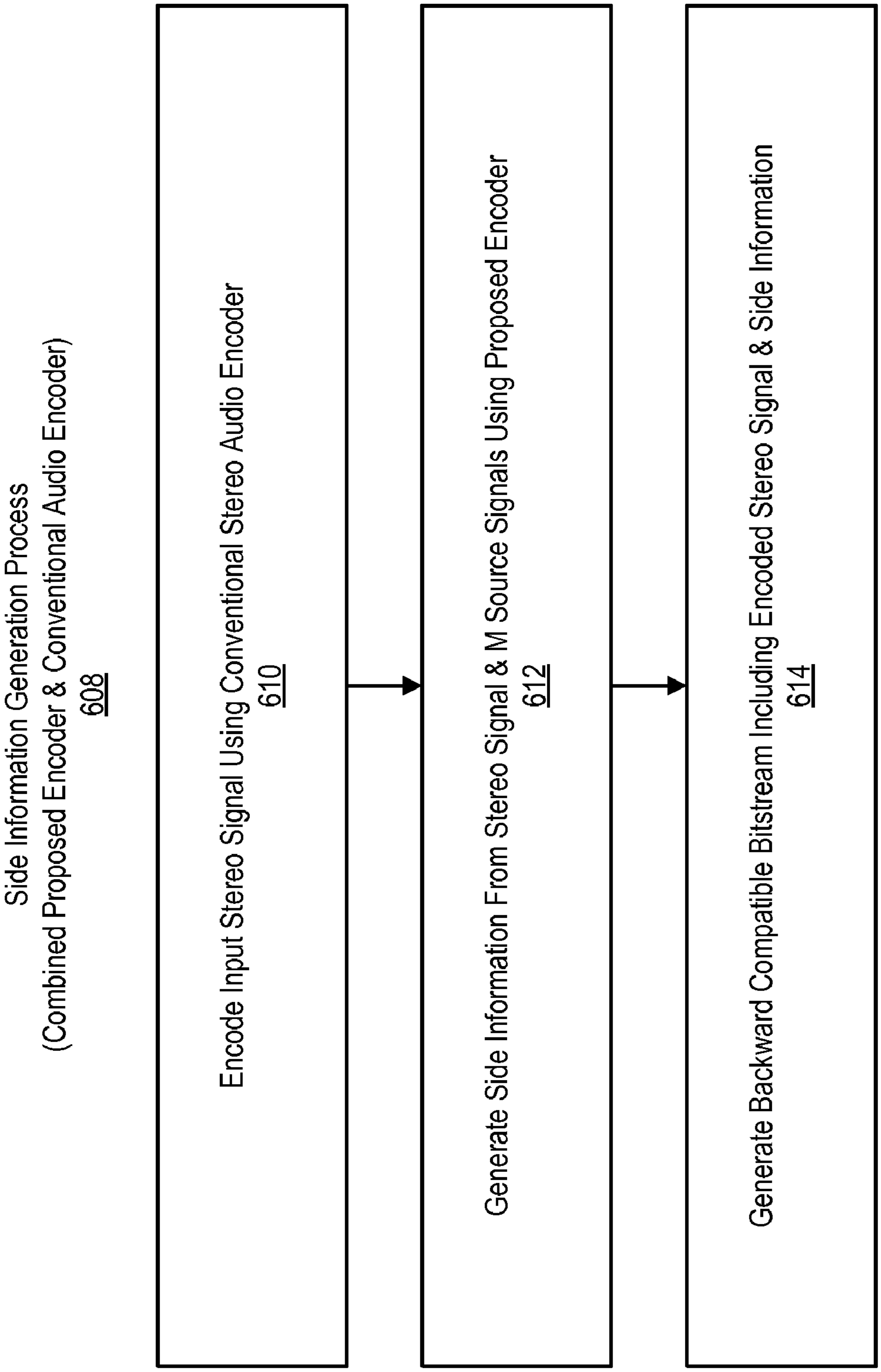
FIG. 6B is a flow diagram of an implementation of an encoding process using the encoding system of FIG. 1A combined with a conventional stereo audio encoder.

FIG. 6B is a flow diagram of an implementation of an encoding process 608 using the encoding system 100 of FIG. 1A combined with a conventional stereo audio encoder. An input stereo signal is encoded using a conventional stereo audio encoder (610). Side information is generated from the stereo signal and M source signals using the encoding system 100 of FIG. 1A (612). One or more backward compatible bitstreams including the encoded stereo signal and the side information are generated (614).

Figure 7A:
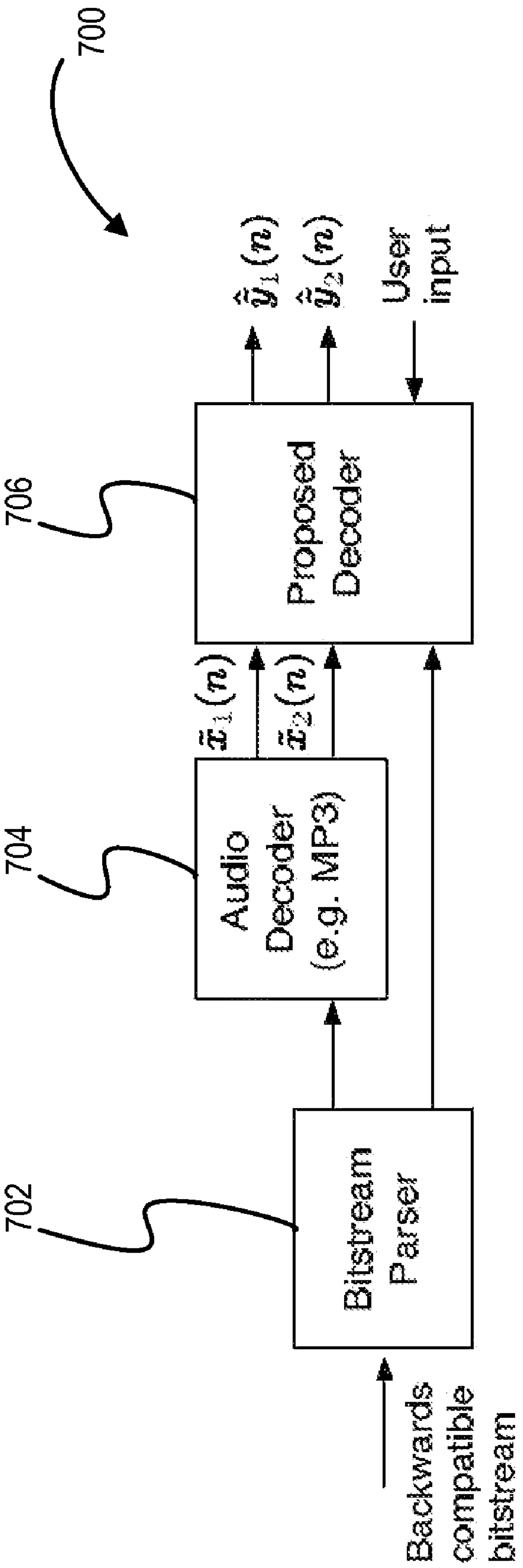
FIG. 7A is a block diagram of an implementation of the remixing system of FIG. 3A combined with a conventional stereo audio decoder.

FIG. 7A is a block diagram of an implementation of the remixing system 300 of FIG. 3A combined with a conventional stereo audio decoder to provide a combined system 700. In some implementations, the combined system 700 generally includes a bitstream parser 702, a conventional audio decoder 704 (e.g., MP3, AAC) and a proposed decoder 706. In some implementations, the proposed decoder 706 is the remixing system 300 of FIG. 3A.

In the example shown, the bitstream is separated into a stereo audio bitstream and a bitstream containing side information needed by the proposed decoder 706 to provide remixing capability. The stereo signal is decoded by the conventional audio decoder 704 and fed to the proposed decoder 706, which modifies the stereo signal as a function of the side information obtained from the bitstream and user input (e.g., mixing gains $c_i$ and $d_i$).

Figure 7B:
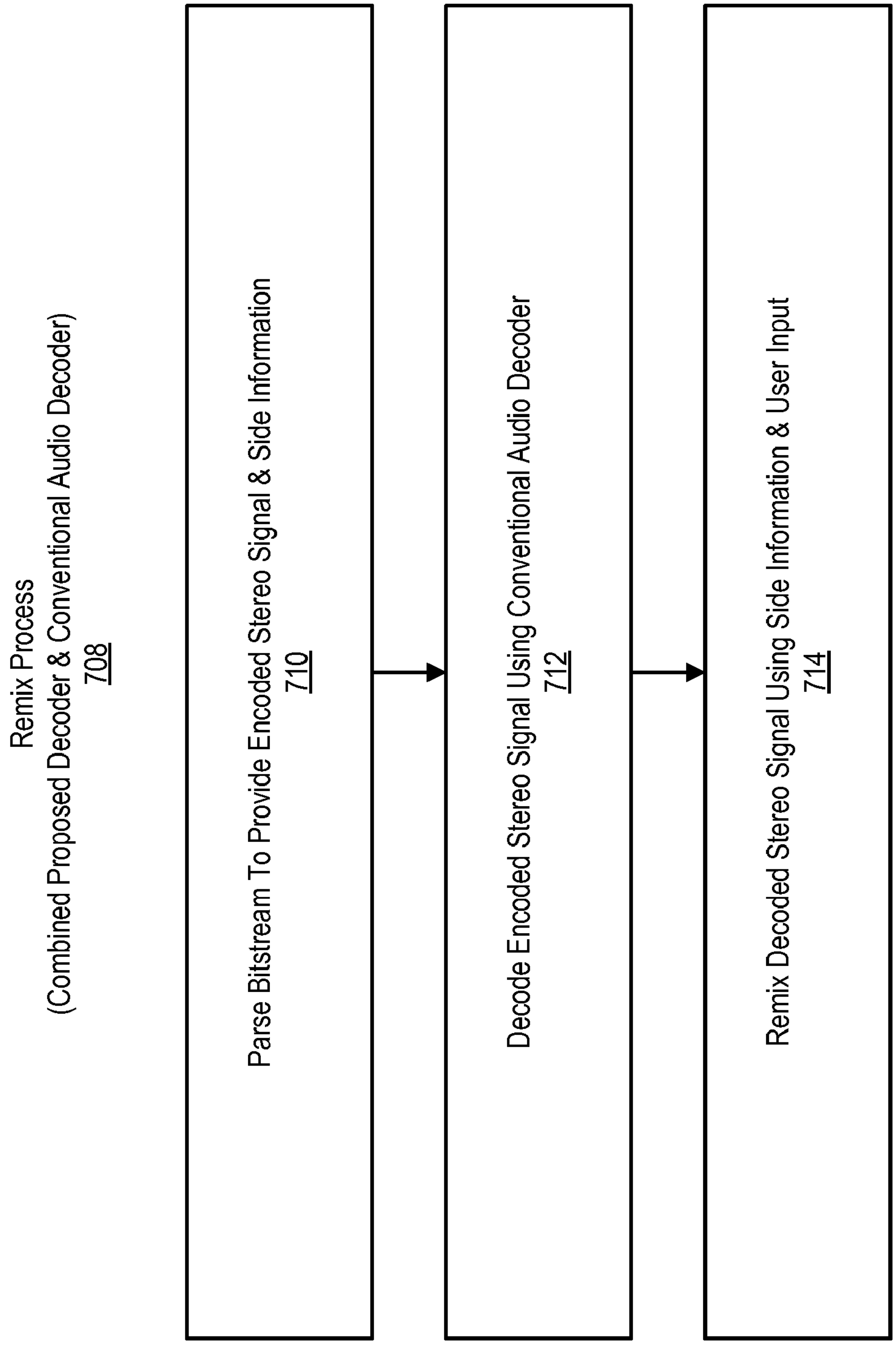
FIG. 7B is a flow diagram of an implementation of a remix process using the remixing system of FIG. 7A combined with a stereo audio decoder.

FIG. 7B is a flow diagram of one implementation of a remix process 708 using the combined system 700 of FIG. 7A. A bitstream received from an encoder is parsed to provide an encoded stereo signal bitstream and side information bitstream (710). The encoded stereo signal is decoded using a conventional audio decoder (712). The decoded stereo signal is remixed using side information and user input (714). Example decoders include MP3, AAC (including the various standardized profiles of AAC), parametric stereo, spectral band replication (SBR), MPEG surround, or any combination thereof. The decoded stereo signal is remixed using the side information and user input (e.g., $c_i$ and $d_i$).

IV. Remixing of Multi-Channel Audio Signals

In some implementations, the encoding and remixing systems 100, 300, described in previous sections can be extended to remixing multi-channel audio signals (e.g., 5.1 surround signals). Hereinafter, a stereo signal and multi-channel signal are also referred to as "plural-channel" signals. Those with ordinary skill in the art would understand how to rewrite [7] to [22] for a multi-channel encoding/decoding scheme, i.e., for more than two signals $x_1(k), x_2(k), x_3(k), \ldots, x_C(k)$, where C is the number of audio channels of the mixed signal.

Equation [9] for the multi-channel case becomes $$\hat{y}_1(k) = \sum_{c=1}^{C} w_{1c}(k)x_c(k),$$
$$\hat{y}_2(k) = \sum_{c=1}^{C} w_{2c}(k)x_c(k),$$
$$\ldots$$
$$\hat{y}_C(k) = \sum_{c=1}^{C} w_{Cc}(k)x_c(k),. \quad (27)$$

An equation like [11] with C equations can be derived and solved to determine the weights, as previously described.

In some implementations, certain channels can be left unprocessed. For example, for 5.1 surround the two rear channels can be left unprocessed and remixing applied only to the front left, right and center channels. In this case, a three channel remixing algorithm can be applied to the front channels.

The audio quality resulting from the disclosed remixing scheme depends on the nature of the modification that is carried out. For relatively weak modifications, e.g., panning change from 0 dB to 15 dB or gain modification of 10 dB, the resulting audio quality can be higher than achieved by conventional techniques. Also, the quality of the proposed disclosed remixing scheme can be higher than conventional remixing schemes because the stereo signal is modified only as necessary to achieve the desired remixing.

The remixing scheme disclosed herein provides several advantages over conventional techniques. First, it allows remixing of less than the total number of objects in a given stereo or multi-channel audio signal. This is achieved by estimating side information as a function of the given stereo audio signal, plus M source signals representing M objects in the stereo audio signal, which are to be enabled for remixing at a decoder. The disclosed remixing system processes the given stereo signal as a function of the side information and as a function of user input (the desired remixing) to generate a stereo signal which is perceptually similar to the stereo signal truly mixed differently.

V. Enhancements to Basic Remixing Scheme

A. Side Information Pre-Processing

When a subband is attenuated too much relative to neighboring subbands, audio artifacts are may occur. Thus, it is desired to restrict the maximum attenuation. Moreover, since the stereo signal and object source signal statistics are measured independently at the encoder and decoder, respectively, the ratio between the measured stereo signal subband power and object signal subband power (as represented by the side information) can deviate from reality. Due to this, the side information can be such that it is physically impossible, e.g., the signal power of the remixed signal [19] can become negative. Both of the above issues can be addressed as described below.

The subband power of the left and right remixed signal is $$E\{y_1^2\} = E\{x_1^2\} + \sum_{i=1}^{M} (c_i^2 - a_i^2) P_{s_i}, \quad (28)$$

$$E\{y_2^2\} = E\{x_2^2\} + \sum_{i=1}^{M} (d_i^2 - b_i^2) P_{s_i},$$

where $P_{si}$ is equal to the quantized and coded subband power estimate given in [25], which is computed as a function of the side information. The subband power of the remixed signal can be limited so that it is never smaller than L dB below the subband power of the original stereo signal, $E\{x_1^2\}$. Similarly, $E\{y_2^2\}$ is limited not to be smaller than L dB below $E\{x_2^2\}$. This result can be achieved with the following operations:

1. Compute the left and right remixed signal subband power according to [28].
2. If $E\{y_1^2\}<QE\{x_1^2\}$, then adjust the side information computed values $P_{si}$ such that $E\{y_1^2\}=QE\{x_1^2\}$ holds. To limit the power of $E\{y_1^2\}$ to be never smaller than A dB below the power of $E\{x_1^2\}$, Q can be set to $Q=10^{-A/10}$. Then, Psi can be adjusted by multiplying it with $$\frac{(1-Q)E\{x_1^2\}}{-\sum_{i=1}^{M} (c_i^2 - a_i^2) P_{s_i}}. \quad (29)$$

3. If $E\{y_2^2\}<QE\{x_2^2\}$, then adjust the side information computed values $P_{si}$, such that $E\{y_2^2\}=QE\{x_2^2\}$ holds. This can be achieved by multiplying $P_{si}$ with $$\frac{(1-Q)E\{x_2^2\}}{-\sum_{i=1}^{M} (d_i^2 - b_i^2) P_{s_i}}. \quad (30)$$

4. The value of $\hat{E}\{s_i^2(k)\}$ is set to the adjusted $P_{si}$, and the weights $w_{11}$, $w_{12}$, $w_{21}$ and $w_{22}$ are computed.

B. Decision between Using Four or Two Weights

For many cases, two weights [18] are adequate for computing the left and right remixed signal subbands [9]. In some cases, better results can be achieved by using four weights [13] and [15]. Using two weights means that for generating the left output signal only the left original signal is used and the same for the right output signal. Thus, a scenario where four weights are desirable is when an object on one side is remixed to be on the other side. In this case, it would be expected that using four weights is favorable because the signal which was originally only on one side (e.g., in left channel) will be mostly on the other side (e.g., in right channel) after remixing. Thus, four weights can be used to allow signal flow from an original left channel to a remixed right channel and vice-versa.

When the least squares problem of computing the four weights is ill-conditioned the magnitude of the weights may be large. Similarly, when the above described one-side-to-other-side remixing is used, the magnitude of the weights when only two weights are used can be large. Motivated by this observation, in some implementations the following criterion can be used to decide whether to use four or two weights.

If A<B, then use four weights, else use two weights. A and B are a measure of the magnitude of the weights for the four and two weights, respectively. In some implementations, A and B are computed as follows. For computing A, first compute the four weights according to [13] and [15] and then set $A=w_{11}^2+w_{12}^2+w_{21}^2+w_{22}^2$. For computing B, the weights can be computed according to [18] and then $B=w_{11}^2+w_{22}^2$ is computed.

C. Improving Degree of Attenuation when Desired

When a source is to be totally removed, e.g., removing the lead vocal track for a Karaoke application, its mixing gains are $c_i=0$, and $d_i=0$. However, when a user chooses zero mixing gains the degree of achieved attenuation can be limited. Thus, for improved attenuation, the source subband power values of the corresponding source signals obtained from the side information, $\hat{E}\{s_i^2(k)\}$, can be scaled by a value greater than one (e.g., 2) before being used to compute the weights $w_{11}$, $w_{12}$, $w_{21}$ and $w_{22}$.

D. Improving Audio Quality by Weight Smoothing

It has been observed that the disclosed remixing scheme may introduce artifacts in the desired signal, especially when an audio signal is tonal or stationary. To improve audio quality, at each subband, a stationarity/tonality measure can be computed. If the stationarity/tonality measure exceeds a certain threshold, $TON_0$, then the estimation weights are smoothed over time. The smoothing operation is described as follows: For each subband, at each time index k, the weights which are applied for computing the output subbands are obtained as follows:

If $TON(k)>TON_0$, then $$\tilde{w}_{11}(k)=\alpha w_{11}(k)+(1-\alpha)\tilde{w}_{11}(k-1),$$

$$\tilde{w}_{12}(k)=\alpha w_{21}(k)+(1-\alpha)\tilde{w}_{12}(k-1),$$

$$\tilde{w}_{21}(k)=\alpha w_{21}(k)+(1-\alpha)\tilde{w}_{21}(k-1),$$

$$\tilde{w}_{22}(k)=\alpha w_{22}(k)+(1-\alpha)\tilde{w}_{22}(k-1), \quad (31)$$

where $\tilde{w}_{11}(k)$, $\tilde{w}_{12}(k)$, $\tilde{w}_{21}(k)$ and $\tilde{w}_{22}(k)$ are the smoothed weights and $w_{11}(k)$, $w_{12}(k)$, $w_{21}(k)$ and $w_{22}(k)$ are the non-smoothed weights computed as described earlier.

else $$\tilde{w}_{11}(k)=w_{11}(k),$$

$$\tilde{w}_{12}(k)=w_{12}(k),$$

$$\tilde{w}_{21}(k)=w_{21}(k),$$

$$\tilde{w}_{22}(k)=w_{22}(k). \quad (32)$$

E. Ambience/Reverb Control

The remix technique described herein provides user control in terms of mixing gains $c_i$ and $d_i$. This corresponds to determining for each object the gain, $G_i$, and amplitude panning, $L_i$ (direction), where the gain and panning are fully determined by $c_i$ and $d_i$, $$G_i = 10\log_{10}(c_i^2 + d_i^2), \quad (33)$$

$$L_i = 20\log_{10}\frac{c_i}{d_i}.$$

In some implementations, it may be desired to control other features of the stereo mix other than gain and amplitude panning of source signals. In the following description, a technique is described for modifying a degree of ambience of a stereo audio signal. No side information is used for this decoder task.

In some implementations, the signal model given in [44] can be used to modify a degree of ambience of a stereo signal, where the subband power of $n_1$ and $n_2$ are assumed to be equal, i.e., $$E\{n_1^2(k)\}=E\{n_2^2(k)\}=P_N(k). \quad (34)$$

Again, it can be assumed that s, $n_1$ and $n_2$ are mutually independent. Given these assumptions, the coherence [17] can be written as $$\phi(k) = \frac{\sqrt{(E\{x_1^2(k)\} - P_N(k))(E\{x_2^2(k)\} - P_N(k))}}{\sqrt{E\{x_1^2(k)\}E\{x_2^2(k)\}}}. \quad (35)$$

This corresponds to a quadratic equation with variable $P_N(k)$, $$P_N^2(k)-(E\{x_1^2(k)\}+E\{x_2^2(k)\})P_N(k)+E\{x_1^2(k)\}E\{x_2^2(k)\}(1-\phi(k)^2)=0. \quad (36)$$

The solutions of this quadratic are $$P_N(k) = \frac{(E\{x_1^2(k)\} + E\{x_2^2(k)\} \pm \sqrt{(E\{x_1^2(k)\} + E\{x_2^2(k)\})^2 - 4E\{x_1^2(k)\}E\{x_2^2(k)\}(1-\phi(k)^2)}}{2}. \quad (37)$$

The physically possible solution is the one with the negative sign before the square-root, $$P_N(k) = \frac{(E\{x_1^2(k)\} + E\{x_2^2(k)\}) - \sqrt{(E\{x_1^2(k)\} + E\{x_2^2(k)\})^2 - 4E\{x_1^2(k)\}E\{x_2^2(k)\}(1-\phi(k)^2)}}{2}, \quad (38)$$

because $P_N(k)$ has to be smaller than or equal to $E\{x_1^2(k)\}+E\{x_2^2(k)\}$.

In some implementations, to control the left and right ambience, the remix technique can be applied relative to two objects: One object is a source with index $i_1$ with subband power $E\{s_{i1}^2(k)\}=P_N(k)$ on the left side, i.e., $a_{i1}=1$ and $b_{i1}=0$. The other object is a source with index $i_2$ with subband power $E\{s_{i2}^2(k)\}=P_N(k)$ on the right side, i.e., $a_{i2}=0$ and $b_{i2}=1$. To change the amount of ambience, a user can choose $c_{i1}=d_{i1}=10^{g_a/20}$ and $c_{i2}=d_{i1}=0$, where $g_a$ is the ambience gain in dB.

F. Different Side Information

In some implementations, modified or different side information can be used in the disclosed remixing scheme that are more efficient in terms of bitrate. For example, in [24] $A_i(k)$ can have arbitrary values. There is also a dependence on the level of the original source signal $s_i(n)$. Thus, to get side information in a desired range, the level of the source input signal would need to be adjusted. To avoid this adjustment, and to remove the dependence of the side information on the original source signal level, in some implementations the source subband power can be normalized not only relative to the stereo signal subband power as in [24], but also the mixing gains can be considered:

$$A_i(k) = 10\log_{10}\frac{(a_i^2 + b_i^2)E\{s_i^2\}}{E\{x_1^2(k)\} + E\{x_2^2(k)\}}. \quad (39)$$

This corresponds to using as side information the source power contained in the stereo signal (not the source power directly), normalized with the stereo signal. Alternatively, one can use a normalization like this:

$$A_i(k) = 10\log_{10}\frac{E\{s_i^2(k)\}}{\frac{1}{a_i^2}E\{x_1^2(k)\} + \frac{1}{b_i^2}E\{x_2^2(k)\}}. \quad (40)$$

This side information is also more efficient since $A_i(k)$ can only take values smaller or equal than 0 dB. Note that [39] and [40] can be solved for the subband power $E\{s_i^2(k)\}$.

G. Stereo Source Signals/Objects

The remix scheme described herein can easily be extended to handle stereo source signals. From a side information perspective, stereo source signals are treated like two mono source signals: one being only mixed to left and the other being only mixed to right. That is, the left source channel i has a non-zero left gain factor $a_i$ and a zero right gain factor $b_{i+1}$. The gain factors, $a_i$ and $b_{i+1}$, can be estimated with [6]. Side information can be transmitted as if the stereo source would be two mono sources. Some information needs to be transmitted to the decoder to indicated to the decoder which sources are mono sources and which are stereo sources.

Regarding decoder processing and a graphical user interface (GUI), one possibility is to present at the decoder a stereo source signal similarly as a mono source signal. That is, the stereo source signal has a gain and panning control similar to a mono source signal. In some implementations, the relation between the gain and panning control of the GUI of the non-remixed stereo signal and the gain factors can be chosen to be:

$$GAIN_0 = 0\text{ dB}, \quad (41)$$

$$PAN_0 = 20\log_{10}\frac{b_{i+1}}{a_i}.$$

That is, the GUI can be initially set to these values. The relation between the GAIN and PAN chosen by the user and the new gain factors can be chosen to be:

$$\text{GAIN} = 10\log_{10}\frac{(c_i^2 + d_{i+1}^2)}{(a_i^2 + b_{i+1}^2)}, \quad (42)$$

$$\text{PAN} = 20\log_{10}\frac{d_{i+1}}{c_i}.$$

Equations [42] can be solved for $c_i$ and $d_{i+1}$, which can be used as remixing gains (with $c_{i+1}=0$ and $d_i=0$). The described functionality is similar to a "balance" control on a stereo amplifier. The gains of the left and right channels of the source signal are modified without introducing cross-talk.

VI. Blind Generation of Side Information

A. Fully Blind Generation of Side Information

In the disclosed remixing scheme, the encoder receives a stereo signal and a number of source signals representing objects that are to be remixed at the decoder. The side information necessary for remixing a source single with index i at the decoder is determined from the gain factors, $a_i$ and $b_i$, and the subband power $E\{s_i^2(k)\}$. The determination of side information was described in earlier sections in the case when the source signals are given.

While the stereo signal is easily obtained (since this corresponds to the product existing today), it may be difficult to obtain the source signals corresponding to the objects to be remixed at the decoder. Thus, it is desirable to generate side information for remixing even if the object's source signals are not available. In the following description, a fully blind generation technique is described for generating side information from only the stereo signal.

Figure 8A:
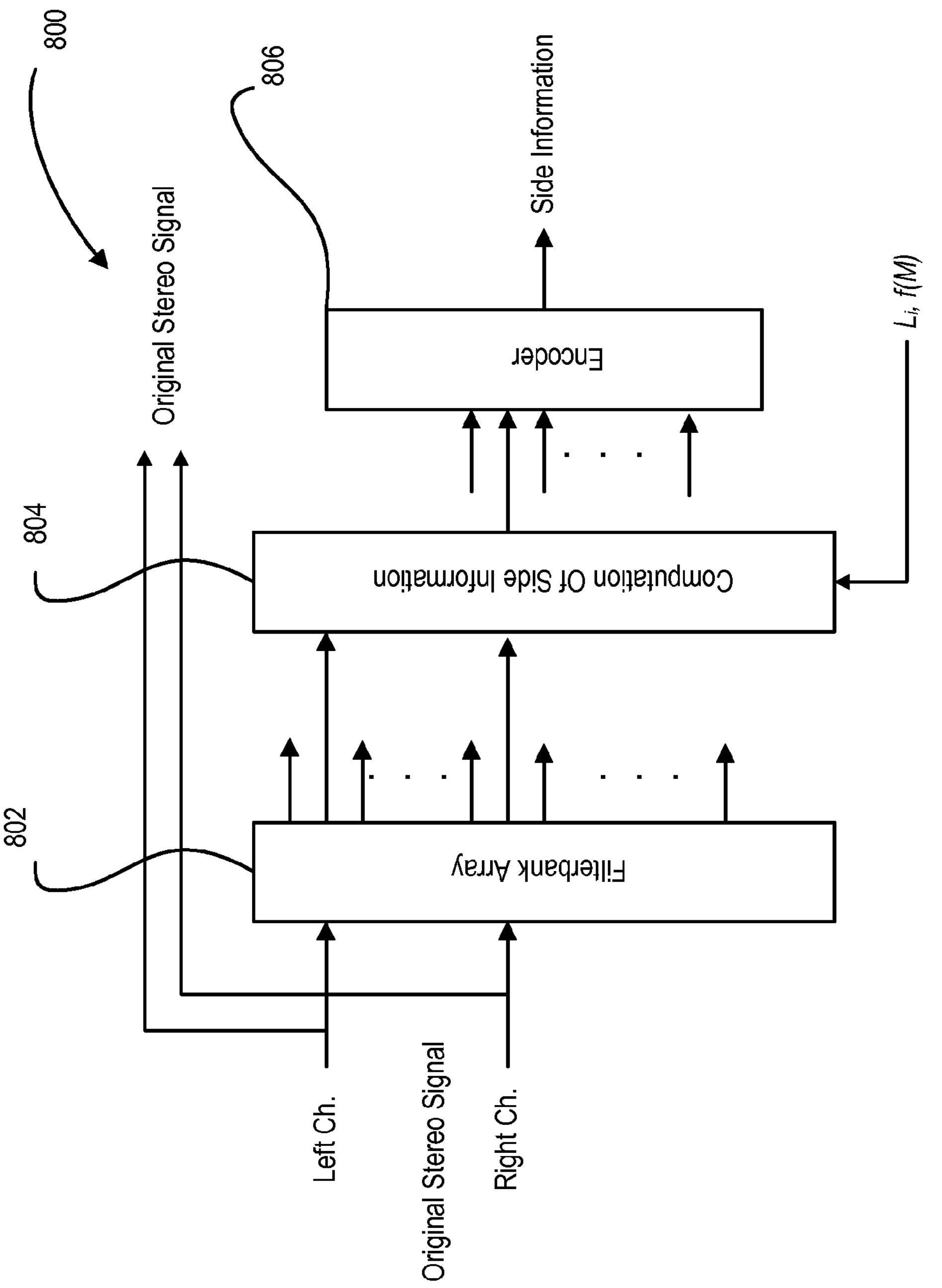
FIG. 8A is a block diagram of an implementation of an encoding system implementing fully blind side information generation.

FIG. 8A is a block diagram of an implementation of an encoding system 800 implementing fully blind side information generation. The encoding system 800 generally includes a filterbank array 802, a side information generator 804 and an encoder 806. The stereo signal is received by the filterbank array 802 which decomposes the stereo signal (e.g., right and left channels) into subband pairs. The subband pairs are received by the side information processor 804 which generates side information from the subband pairs using a desired source level difference $L_i$ and a gain function $f(M)$. Note that neither the filterbank array 802 nor the side information processor 804 operates on sources signals. The side information is derived entirely from the input stereo signal, desired source level difference, $L_i$ and gain function, $f(M)$.

Figure 8B:
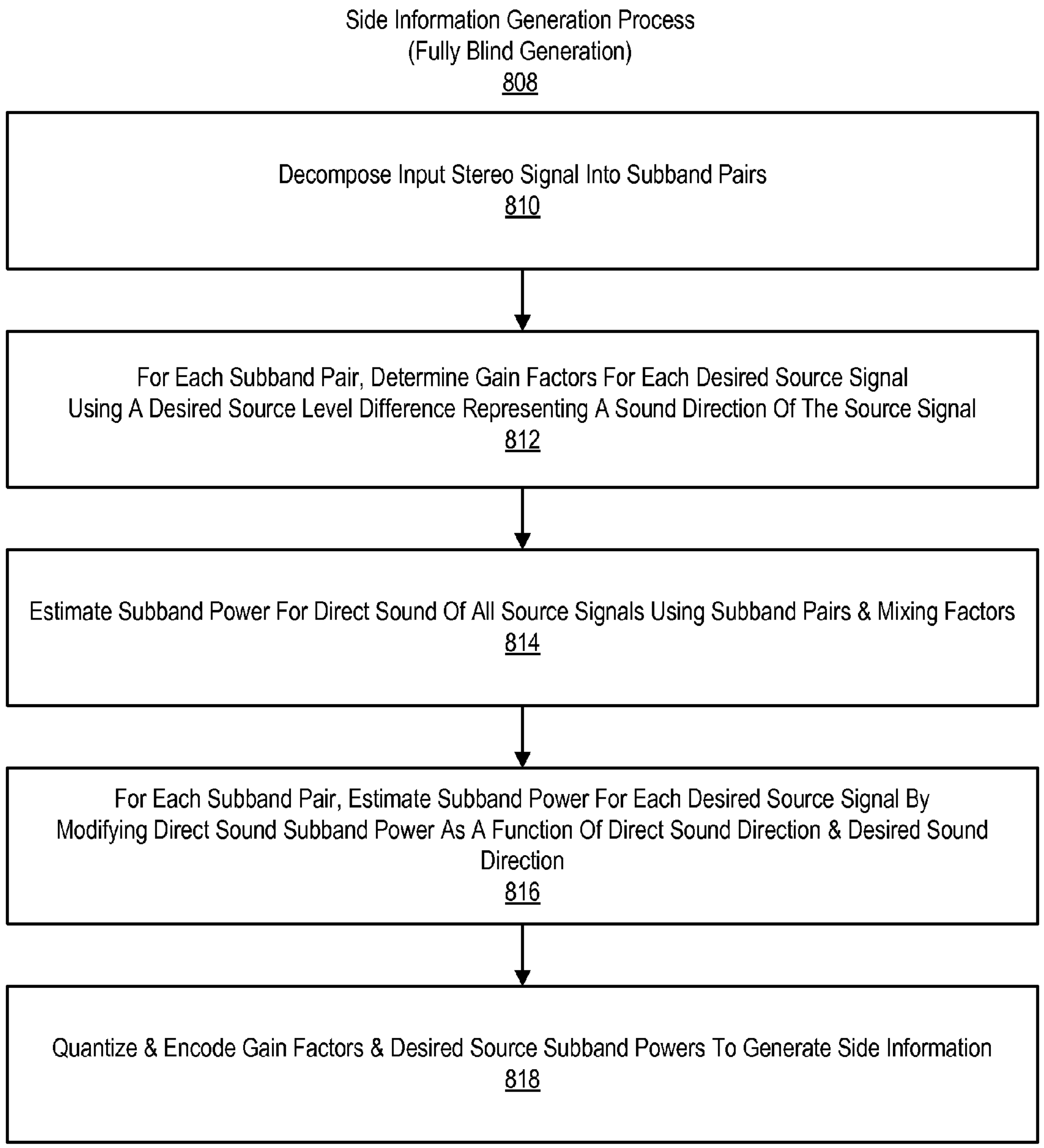
FIG. 8B is a flow diagram of an implementations of an encoding process using the encoding system of FIG. 8A.

FIG. 8B is a flow diagram of an implementation of an encoding process 808 using the encoding system 800 of FIG. 8A. The input stereo signal is decomposed into subband pairs (810). For each subband, gain factors, $a_i$ and $b_i$, are determined for each desired source signal using a desired source level difference value, $L_i$ (812). For a direct sound source signal (e.g., a source signal center-panned in the sound stage), the desired source level difference is $L_i=0$ dB. Given $L_i$, the gain factors are computed:

$$a_i = \frac{1}{\sqrt{1+A}} \quad (43)$$

$$b_i = \frac{\sqrt{A}}{\sqrt{1+A}},$$

where $A=10^{Li/10}$. Note that $a_i$ and $b_i$ have been computed such that $a_i^2+b_i^2=1$. This condition is not a necessity; rather, it is an arbitrary choice to prevent $a_i$ or $b_i$ from being large when the magnitude of $L_i$ is large.

Next, the subband power of the direct sound is estimated using the subband pair and mixing gains (814). To compute the direct sound subband power, one can assume that each input signal left and right subband at each time can be written $$x_1=as+n_1,$$

$$x_2=bs+n_2, \quad (44)$$

where a and b are mixing gains, s represents the direct sound of all source signals and $n_1$ and $n_2$ represent independent ambient sound.

It can be assumed that a and b are $$a = \frac{1}{\sqrt{1+B}}, \quad (45)$$

$$b = \frac{\sqrt{B}}{\sqrt{1+B}},$$

where $B=E\{x_2^2(k)\}/E\{x_1^2(k)\}$. Note that a and b can be computed such that the level difference with which s is contained in $x_2$ and $x_1$ is the same as the level difference between $x_2$ and $x_1$. The level difference in dB of the direct sound is $M=\log_{10}B$.

We can compute the direct sound subband power, $E\{s^2(k)\}$, according to the signal model given in [44]. In some implementations, the following equation system is used:

$$E\{x_1^2(k)\}=a^2E\{s^2(k)\}+E\{n_1^2(k)\},$$

$$E\{x_2^2(k)\}=b^2E\{s^2(k)\}+E\{n_2^2(k)\},$$

$$E\{x_1(k)x_2(k)\}=abE\{s^2(k)\}. \quad (46)$$

It has been assumed in [46] that s, $n_1$ and $n_2$ in [34] are mutually independent, the left-side quantities in [46] can be measured and a and b are available. Thus, the three unknowns in [46] are $E\{s^2(k)\}$, $E\{n_1^2(k)\}$ and $E\{n_2^2(k)\}$. The direct sound subband power, $E\{s^2(k)\}$, can be given by $$E\{s^2(k)\} = \frac{E\{x_1(k)x_2(k)\}}{ab}. \quad (47)$$

The direct sound subband power can also be written as a function of the coherence [17], $$E\{s^2(k)\} = \frac{\phi\sqrt{E\{x_1^2(k)\}E\{x_2^2(k)\}}}{ab}. \quad (48)$$

In some implementations, the computation of desired source subband power, $E\{s_i^2(k)\}$, can be performed in two steps: First, the direct sound subband power, $E\{s^2(k)\}$, is computed, where s represents all sources' direct sound (e.g., center-panned) in [44]. Then, desired source subband powers, $E\{s_i^2(k)\}$, are computed (816) by modifying the direct sound subband power, $E\{s^2(k)\}$, as a function of the direct sound direction (represented by M) and a desired sound direction (represented by the desired source level difference L):

$$E\{s_i^2(k)\}=f(M(k))E\{s^2(k)\}, \quad (49)$$

where $f(.)$ is a gain function, which as a function of direction, returns a gain factor that is close to one only for the direction of the desired source. As a final step, the gain factors and subband powers $E\{s_i^2(k)\}$ can be quantized and encoded to generate side information (818).

Figure 9:
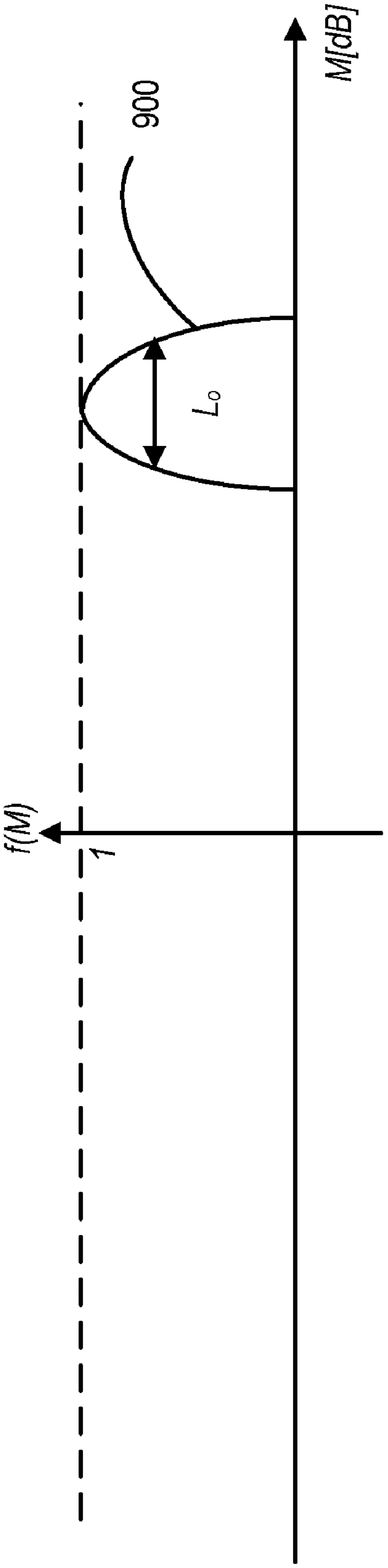
FIG. 9 illustrates an example gain function, ƒ(M), for a desired source level difference, $L_i$=L dB.

FIG. 9 illustrates an example gain function $f(M)$ for a desired source level difference $L_i$=L dB. Note that the degree of directionality can be controlled in terms of choosing $f(M)$ to have a more or less narrow peak 900 around the desired direction $L_o$. For a desired source in the center, a peak width of $L_o$=6 dB can be used.

Note that with the fully blind technique described above, the side information ($a_i$, $b_i$, $E\{s_i^2(k)\}$) for a given source signal $s_i$ can be determined.

B. Combination Between Blind and Non-Blind Generation of Side Information

The fully blind generation technique described above may be limited under certain circumstances. For example, if two objects have the same position (direction) on a stereo sound stage, then it may not be possible to blindly generate side information relating to one or both objects.

An alternative to fully blind generation of side information is partially blind generation of side information. The partially blind technique generates an object waveform which roughly corresponds to the original object waveform. This may be done, for example, by having singers or musicians play/reproduce the specific object signal. Or, one may deploy MIDI data for this purpose and let a synthesizer generate the object signal. In some implementations, the "rough" object waveform is time aligned with the stereo signal relative to which side information is to be generated. Then, the side information can be generated using a process which is a combination of blind and non-blind side information generation.

Figure 10:
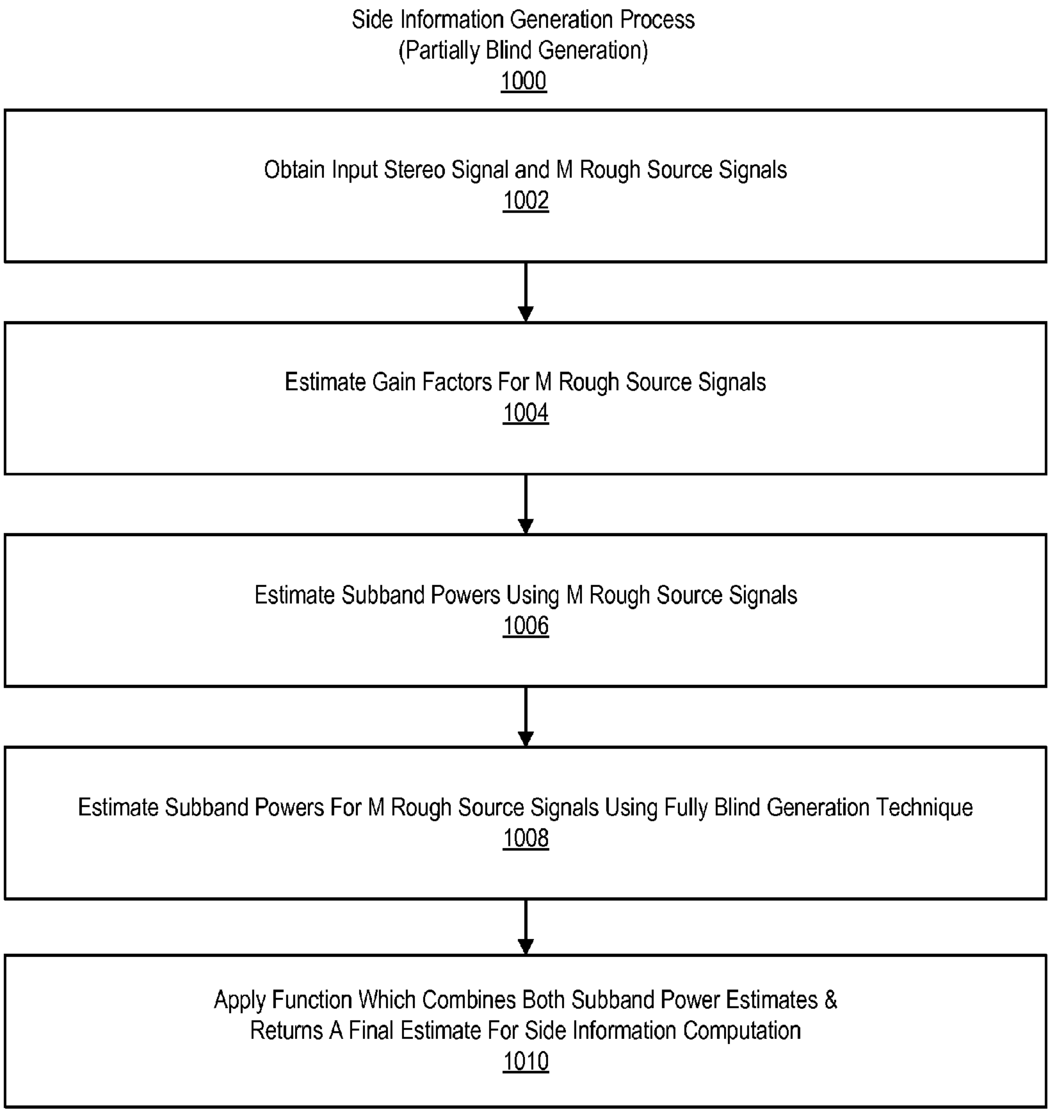
FIG. 10 is a diagram of an implementation of a side information generation process using a partially blind generation technique.

FIG. 10 is a diagram of an implementation of a side information generation process 1000 using a partially blind generation technique. The process 1000 begins by obtaining an input stereo signal and M "rough" source signals (1002). Next, gain factors $a_i$ and $b_i$ are determined for the M "rough" source signals (1004). In each time slot in each subband, a first short-time estimate of subband power, $E\{s_i^2(k)\}$, is determined for each "rough" source signal (1006). A second short-time estimate of subband power, Ehat$\{s_i^2(k)\}$, is determined for each "rough" source signal using a fully blind generation technique applied to the input stereo signal (1008).

Finally, the function, is applied to the estimated subband powers, which combines the first and second subband power estimates and returns a final estimate, which effectively can be used for side information computation (1010). In some implementations, the function F( ) is given by $$F(E\{s_i^2(k)\}, \hat{E}\{s_i^2(k)\}) \qquad (50)$$

$$F(E\{s_i^2(k)\},\hat{E}\{s_i^2(k)\})=\min(E\{s_i^2(k)\},\hat{E}\{s_i^2(k)\}).$$

VI. Architectures, User Interfaces, Bitstream Syntax

A. Client/Server Architecture

Figure 11:
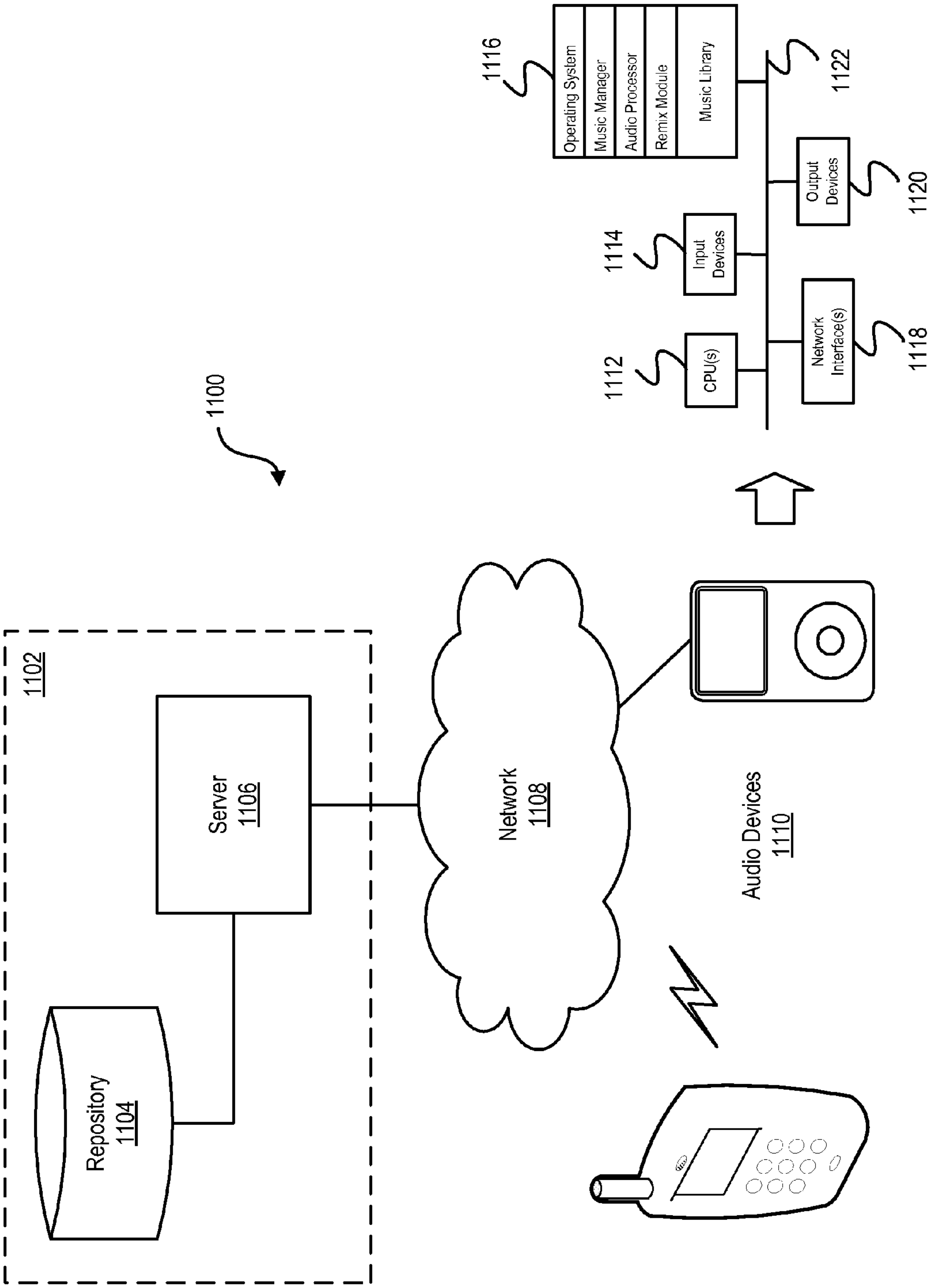
FIG. 11 is a block diagram of an implementation of a client/server architecture for providing stereo signals and M source signals and/or side information to audio devices with remixing capability.

FIG. 11 is a block diagram of an implementation of a client/server architecture 1100 for providing stereo signals and M source signals and/or side information to audio devices 1110 with remixing capability. The architecture 1100 is merely an example. Other architectures are possible, including architectures with more or fewer components.

The architecture 1100 generally includes a download service 1102 having a repository 1104 (e.g., MySQL™) and a server 1106 (e.g., Windows™ NT, Linux server). The repository 1104 can store various types of content, including professionally mixed stereo signals, and associated source signals corresponding to objects in the stereo signals and various effects (e.g., reverberation). The stereo signals can be stored in a variety of standardized formats, including MP3, PCM, AAC, etc.

In some implementations, source signals are stored in the repository 1104 and are made available for download to audio devices 1110. In some implementations, pre-processed side information is stored in the repository 1104 and made available for downloading to audio devices 1110. The pre-processed side information can be generated by the server 1106 using one or more of the encoding schemes described in reference to FIGS. 1A, 6A and 8A.

In some implementations, the download service 1102 (e.g., a Web site, music store) communicates with the audio devices 1110 through a network 1108 (e.g., Internet, intranet, Ethernet, wireless network, peer to peer network). The audio devices 1110 can be any device capable of implementing the disclosed remixing schemes (e.g., media players/recorders, mobile phones, personal digital assistants (PDAs), game consoles, set-top boxes, television receives, media centers, etc.).

B. Audio Device Architecture

In some implementations, an audio device 1110 includes one or more processors or processor cores 1112, input devices 1114 (e.g., click wheel, mouse, joystick, touch screen), output devices 1120 (e.g., LCD), network interfaces 1118 (e.g., USB, FireWire, Ethernet, network interface card, wireless transceiver) and a computer-readable medium 1116 (e.g., memory, hard disk, flash drive). Some or all of these components can send and/or receive information through communication channels 1122 (e.g., a bus, bridge).

In some implementations, the computer-readable medium 1116 includes an operating system, music manager, audio processor, remix module and music library. The operating system is responsible for managing basic administrative and communication tasks of the audio device 1110, including file management, memory access, bus contention, controlling peripherals, user interface management, power management, etc. The music manager can be an application that manages the music library. The audio processor can be a conventional audio processor for playing music files (e.g., MP3, CD audio, etc.) The remix module can be one or more software components that implement the functionality of the remixing schemes described in reference to FIGS. 1-10.

In some implementations, the server 1106 encodes a stereo signal and generates side information, as described in references to FIGS. 1A, 6A and 8A. The stereo signal and side information are downloaded to the audio device 1110 through the network 1108. The remix module decode the signals and side information and provides remix capability based on user input received through an input device 1114 (e.g., keyboard, click-wheel, touch display).

C. User Interface For Receiving User Input

Figure 12:
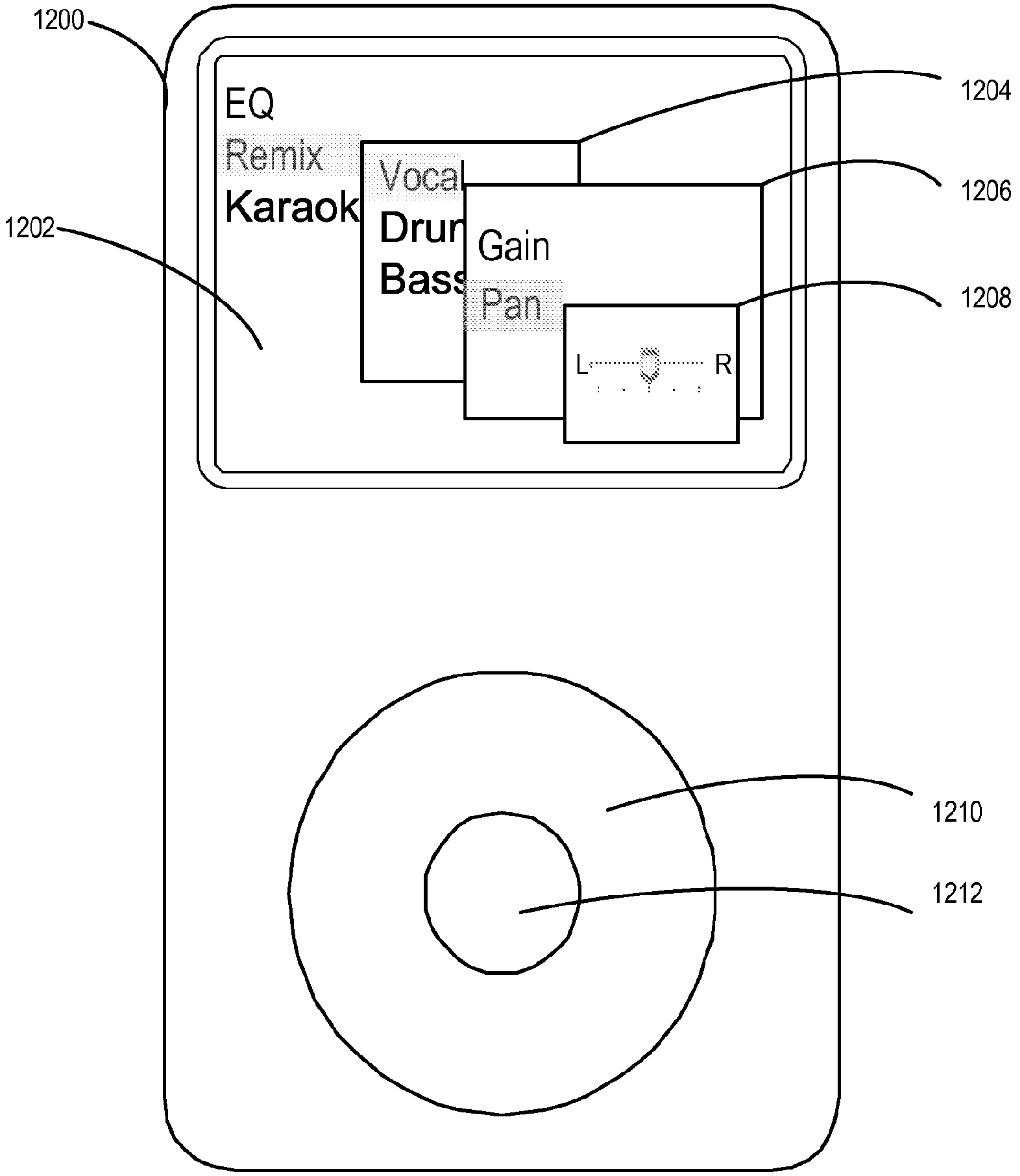
FIG. 12 illustrates an implementation of a user interface for a media player with remix capability.

FIG. 12 is an implementation of a user interface 1202 for a media player 1200 with remix capability. The user interface 1202 can also be adapted to other devices (e.g., mobile phones, computers, etc.) The user interface is not limited to the configuration or format shown, and can include different types of user interface elements (e.g., navigation controls, touch surfaces).

A user can enter a "remix" mode for the device 1200 by highlighting the appropriate item on user interface 1202. In this example, it is assumed that the user has selected a song from the music library and would like to change the pan setting of the lead vocal track. For example, the user may want to hear more lead vocal in the left audio channel.

To gain access to the desired pan control, the user can navigate a series of submenus 1204, 1206 and 1208. For example, the user can scroll through items on submenus 1204, 1206 and 1208, using a wheel 1210. The user can select a highlighted menu item by clicking a button 1212. The submenu 1208 provides access to the desired pan control for the lead vocal track. The user can then manipulate the slider (e.g., using wheel 1210) to adjust the pan of the lead vocal as desired while the song is playing.

D. Bitstream Syntax

In some implementations, the remixing schemes described in reference to FIGS. 1-10 can be included in existing or future audio coding standards (e.g., MPEG-4). The bitstream syntax for the existing or future coding standard can include information that can be used by a decoder with remix capability to determine how to process the bitstream to allow for remixing by a user. Such syntax can be designed to provide backward compatibility with conventional coding schemes. For example, a data structure (e.g., a packet header) included in the bitstream can include information (e.g., one or more bits or flags) indicating the availability of side information (e.g., gain factors, subband powers) for remixing.

The disclosed and other embodiments and the functional operations described in this specification can be implemented in digital electronic circuitry, or in computer software, firmware, or hardware, including the structures disclosed in this specification and their structural equivalents, or in combinations of one or more of them. The disclosed and other embodiments can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the disclosed embodiments can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The disclosed embodiments can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of what is disclosed here, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

VII. Examples of Systems Using Remix Technology

Figure 13:
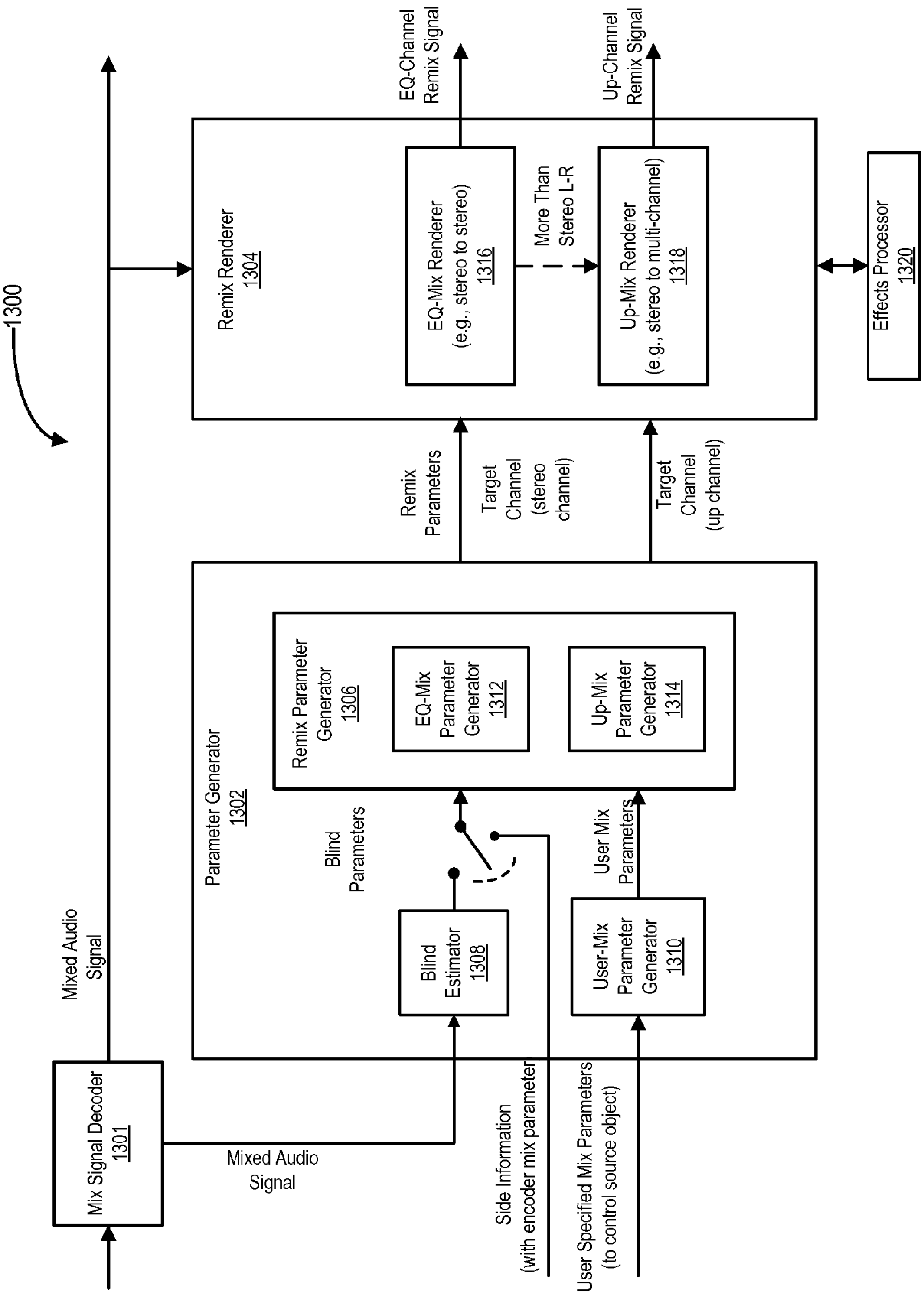
FIG. 13 illustrates an implementation of a decoding system combining spatial audio object (SAOC) decoding and remix decoding.

FIG. 13 illustrates an implementation of a decoder system 1300 combining spatial audio object decoding (SAOC) and remix decoding. SAOC is an audio technology for handling multi-channel audio, which allows interactive manipulation of encoded sound objects.

In some implementations, the system 1300 includes a mix signal decoder 1301, a parameter generator 1302 and a remix renderer 1304. The parameter generator 1302 includes a blind estimator 1308, user-mix parameter generator 1310 and a remix parameter generator 1306. The remix parameter generator 1306 includes an eq-mix parameter generator 1312 and an up-mix parameter generator 1314.

In some implementations, the system 1300 provides two audio processes. In a first process, side information provided by an encoding system is used by the remix parameter generator 1306 to generate remix parameters. In a second process, blind parameters are generated by the blind estimator 1308 and used by the remix parameter generator 1306 to generate remix parameters. The blind parameters and fully or partially blind generation processes can be performed by the blind estimator 1308, as described in reference to FIGS. 8A and 8B.

In some implementations, the remix parameter generator 1306 receives side information or blind parameters, and a set of user mix parameters from the user-mix parameter generator 1310. The user-mix parameter generator 1310 receives mix parameters specified by end users (e.g., GAIN, PAN) and converts the mix parameters into a format suitable for remix processing by the remix parameter generator 1306 (e.g., convert to gains $c_i$, $d_{i+1}$). In some implementations, the user-mix parameter generator 1310 provides a user interface for allowing users to specify desired mix parameters, such as, for example, the media player user interface 1200, as described in reference to FIG. 12.

In some implementations, the remix parameter generator 1306 can process both stereo and multi-channel audio signals. For example, the eq-mix parameter generator 1312 can generate remix parameters for a stereo channel target, and the up-mix parameter generator 1314 can generate remix parameters for a multi-channel target. Remix parameter generation based on multi-channel audio signals were described in reference to Section IV.

In some implementations, the remix renderer 1304 receives remix parameters for a stereo target signal or a multi-channel target signal. The eq-mix renderer 1316 applies stereo remix parameters to the original stereo signal received directly from the mix signal decoder 1301 to provide a desired remixed stereo signal based on the formatted user specified stereo mix parameters provided by the user-mix parameter generator 1310. In some implementations, the stereo remix parameters can be applied to the original stereo signal using an n×n matrix (e.g., a 2×2 matrix) of stereo remix parameters. The up-mix renderer 1318 applies multi-channel remix parameters to an original multi-channel signal received directly from the mix signal decoder 1301 to provide a desired remixed multi-channel signal based on the formatted user specified multi-channel mix parameters provided by the user-mix parameter generator 1310. In some implementations, an effects generator 1320 generates effects signals (e.g., reverb) to be applied to the original stereo or multi-channel signals by the eq-mix renderer 1316 or up-mix renderer, respectively. In some implementations, the up-mix renderer 1318 receives the original stereo signal and converts (or up-mixes) the stereo signal to a multi-channel signal in addition to applying the remix parameters to generate a remixed multi-channel signal.

The system 1300 can process audio signals having a variety of channel configurations, allowing the system 1300 to be integrated into existing audio coding schemes (e.g., SAOC, MPEG AAC, parametric stereo), while maintaining backward compatibility with such audio coding schemes.

Figure 14A:
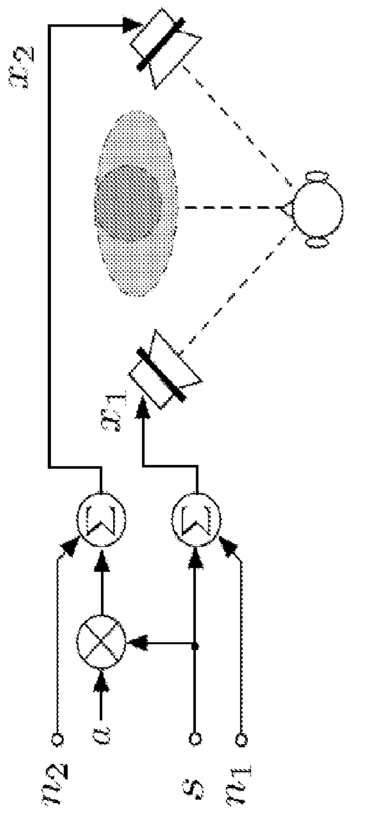
FIG. 14A illustrates a general mixing model for Separate Dialogue Volume (SDV).

FIG. 14A illustrates a general mixing model for Separate Dialogue Volume (SDV). SDV is an improved dialogue enhancement technique described in U.S. Provisional Patent Application No. 60/884,594, for "Separate Dialogue Volume." In one implementation of SDV, stereo signals are recorded and mixed such that for each source the signal goes coherently into the left and right signal channels with specific directional cues (e.g., level difference, time difference), and reflected/reverberated independent signals go into channels determining auditory event width and listener envelopment cues. Referring to FIG. 14A, the factor a determines the direction at which an auditory event appears, where s is the direct sound and $n_1$ and $n_2$ are lateral reflections. The signal s mimics a localized sound from a direction determined by the factor a. The independent signals, $n_1$ and $n_2$, correspond to the reflected/reverberated sound, often denoted ambient sound or ambience. The described scenario is a perceptually motivated decomposition for stereo signals with one audio source, $$x_1(n)=s(n)+n_1$$

$$x_2(n)=as(n)+n_2, \tag{51}$$

capturing the localization of the audio source and the ambience.

Figure 14B:
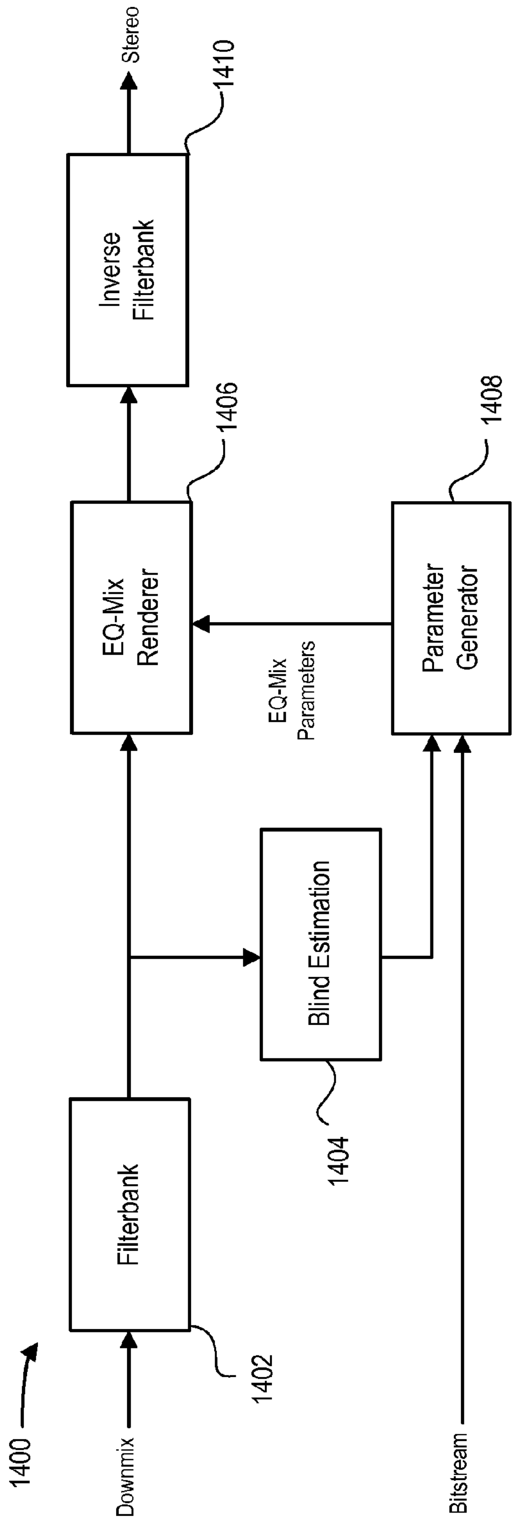
FIG. 14B illustrates an implementation of a system combining SDV and remix technology.

FIG. 14B illustrates an implementation of a system 1400 combining SDV with remix technology. In some implementations, the system 1400 includes a filterbank 1402 (e.g., STFT), a blind estimator 1404, an eq-mix renderer 1406, a parameter generator 1408 and an inverse filterbank 1410 (e.g., inverse STFT).

In some implementations, an SDV downmix signal is received and decomposed by the filterbank 1402 into subband signals. The downmix signal can be a stereo signal, $x_1$, $x_2$, given by [51]. The subband signals $X_1$ (i, k), $X_2$(i, k) are input either directly into the eq-mix renderer 1406 or into the blind estimator 1404, which outputs blind parameters, A, $P_S$, $P_N$. The computation of these parameters is described in U.S. Provisional Patent Application No. 60/884,594, for "Separate Dialogue Volume." The blind parameters are input into the parameter generator 1408, which generates eq-mix parameters, $w_{11}$~$w_{22}$, from the blind parameters and user specified mix parameters g(i,k) (e.g., center gain, center width, cutoff frequency, dryness). The computation of the eq-mix parameters is described in Section I. The eq-mix parameters are applied to the subband signals by the eq-mix renderer 1406 to provide rendered output signals, $y_1$, $y_2$. The rendered output signals of the eq-mix renderer 1406 are input to the inverse filterbank 1410, which converts the rendered output signals into the desired SDV stereo signal based on the user specified mix parameters.

In some implementations, the system 1400 can also process audio signals using remix technology, as described in reference to FIGS. 1-12. In a remix mode, the filterbank 1402 receives stereo or multi-channel signals, such as the signals described in [1] and [27]. The signals are decomposed into subband signals $X_1$ (i, k), $X_2$(i, k), by the filterbank 1402 and input directly input into the eq-renderer 1406 and the blind estimator 1404 for estimating the blind parameters. The blind parameters are input into the parameter generator 1408, together with side information $a_i$, $b_i$, $P_{si}$, received in a bitstream. The parameter generator 1408 applies the blind parameters and side information to the subband signals to generate rendered output signals. The rendered output signals are input to the inverse filterbank 1410, which generates the desired remix signal.

Figure 15:
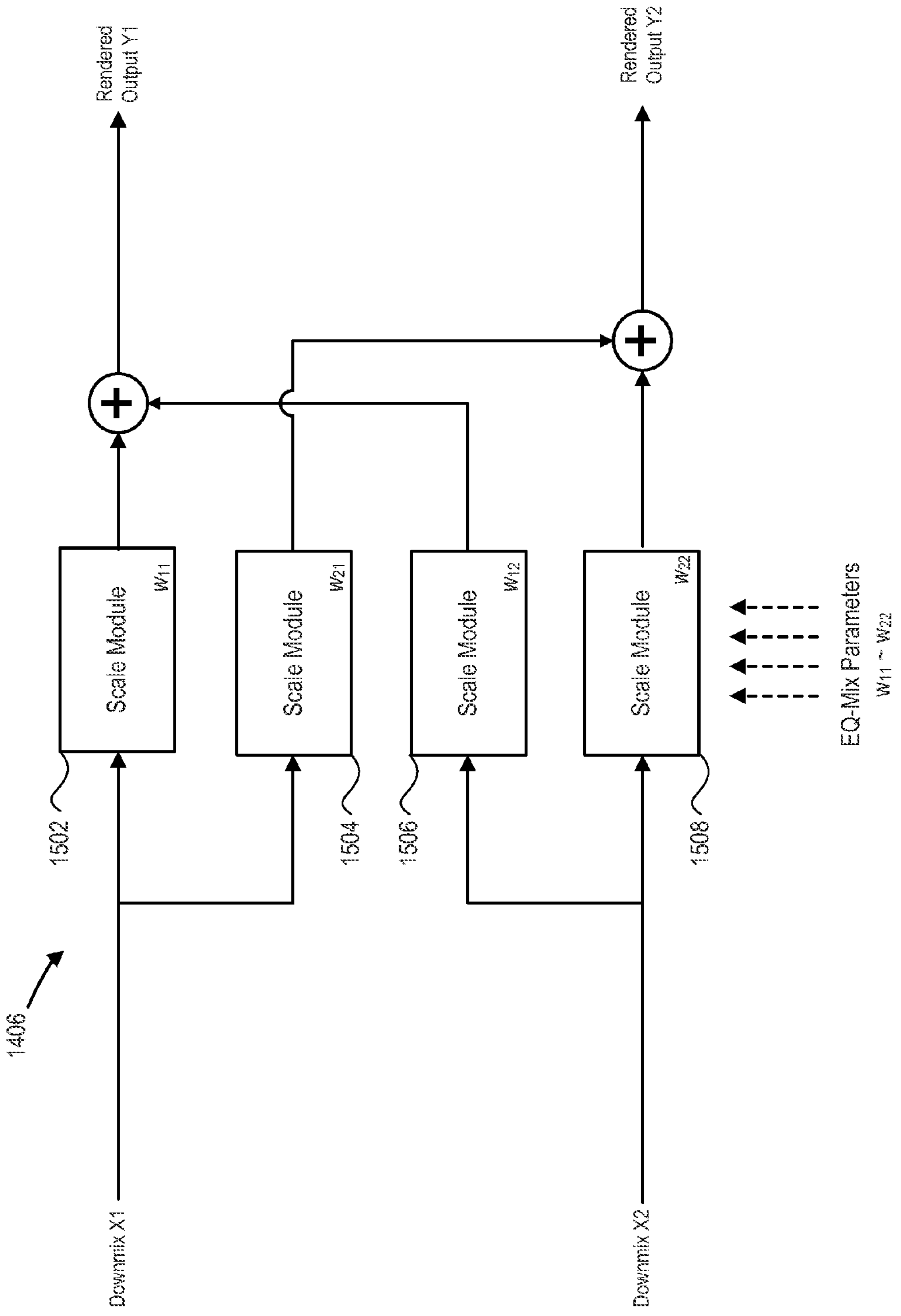
FIG. 15 illustrates an implementation of the eq-mix renderer shown in FIG. 14B.

FIG. 15 illustrates an implementation of the eq-mix renderer 1406 shown in FIG. 14B. In some implementations, a downmix signal X1 is scaled by scale modules 1502 and 1504, and a downmix signal X2 is scaled by scale modules 1506 and 1508. The scale module 1502 scales the downmix signal X1 by the eq-mix parameter $w_{11}$, the scale module 1504 scales the downmix signal X1 by the eq-mix parameter $w_{21}$, the scale module 1506 scales the downmix signal X2 by the eq-mix parameter $w_{12}$ and the scale module 1508 scales the downmix signal X2 by the eq-mix parameter $w_{22}$. The outputs of scale modules 1502 and 1506 are summed to provide a first rendered output signal $y_1$, and the scale modules 1504 and 1508 are summed to provide a second rendered output signal $y_2$.

Figure 16:
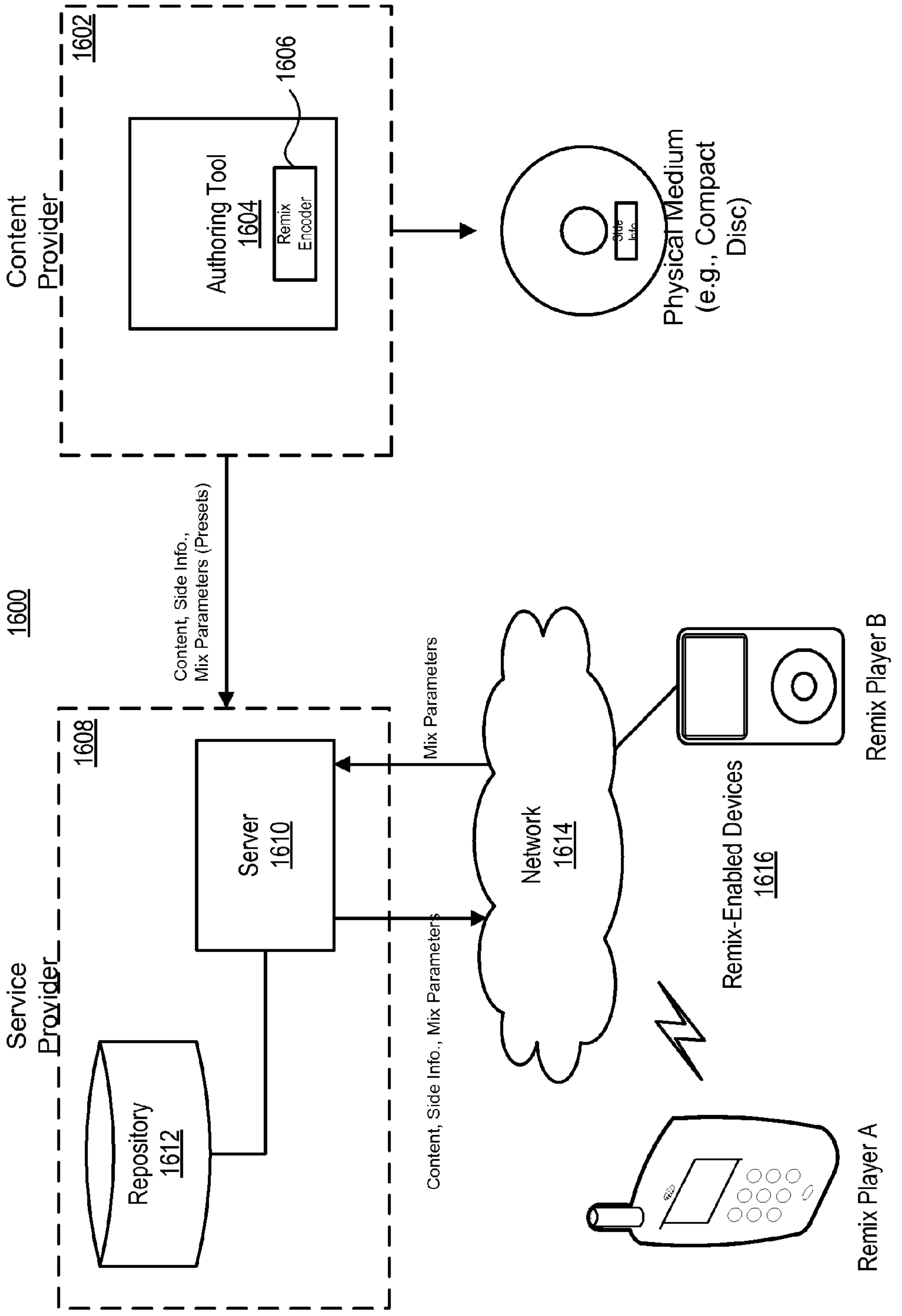
FIG. 16 illustrates an implementation of a distribution system for the remix technology described in reference to FIGS. 1-15.

FIG. 16 illustrates a distribution system 1600 for the remix technology described in reference to FIGS. 1-15. In some implementations, a content provider 1602 uses an authoring tool 1604 that includes a remix encoder 1606 for generating side information, as previously described in reference to FIG. 1A. The side information can be part of one or more files and/or included in a bitstream for a bit streaming service. Remix files can have a unique file extension (e.g., filename.rmx). A single file can include the original mixed audio signal and side information. Alternatively, the original mixed audio signal and side information can be distributed as separate files in a packet, bundle, package or other suitable container. In some implementations, remix files can be distributed with preset mix parameters to help users learn the technology and/or for marketing purposes.

In some implementations, the original content (e.g., the original mixed audio file), side information and optional preset mix parameters ("remix information") can be provided to a service provider 1608 (e.g., a music portal) or placed on a physical medium (e.g., a CD-ROM, DVD, media player, flash drive). The service provider 1608 can operate one or more servers 1610 for serving all or part of the remix information and/or a bitstream containing all of part of the remix information. The remix information can be stored in a repository 1612. The service provider 1608 can also provide a virtual environment (e.g., a social community, portal, bulletin board) for sharing user-generated mix parameters. For example, mix parameters generated by a user on a remix-ready device 1616 (e.g., a media player, mobile phone) can be stored in a mix parameter file that can be uploaded through network 1614 to the service provider 1608 for sharing with other users. The mix parameter file can have a unique extension (e.g., filename.rms). In the example shown, a user generated a mix parameter file using the remix player A and uploaded the mix parameter file to the service provider 1608 through network 1614, where the file was subsequently downloaded through network 1614 by a user operating a remix player B.

The system 1600 can be implemented using any known digital rights management scheme and/or other known security methods to protect the original content and remix information. For example, the user operating the remix player B may need to download the original content separately and secure a license before the user can access or user the remix features provided by remix player B.

Figure 17A:
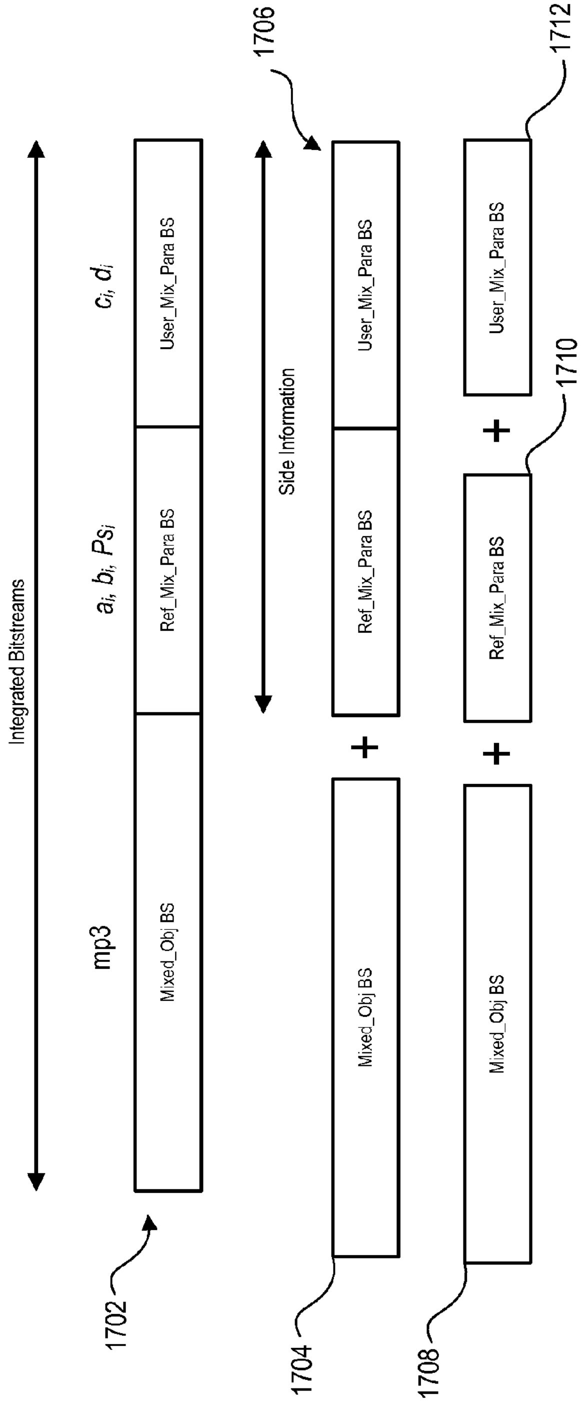
FIG. 17A illustrates elements of various bitstream implementations for providing remix information.

FIG. 17A illustrates basic elements of a bitstream for providing remix information. In some implementations, a single, integrated bitstream 1702 can be delivered to remix-enabled devices that includes a mixed audio signal (Mixed_Obj BS), gain factors and subband powers (Ref_Mix_Para BS) and user-specified mix parameters (User_Mix_Para BS). In some implementations, multiple bitstreams for remix information can be independently delivered to remix-enabled devices. For example, the mixed audio signal can be delivered in a first bitstream 1704, and the gain factors, subband powers and user-specified mix parameters can be delivered in a second bitstream 1706. In some implementations, the mixed audio signal, the gain factors and subband powers, and the user-specified mix parameters can be delivered in three separate bitstreams, 1708, 1710 and 1712. These separate bit streams can be delivered at the same or different bit rates. The bitstreams can be processed as needed using a variety of known techniques to preserve bandwidth and ensure robustness, including bit interleaving, entropy coding (e.g., Huffman coding), error correction, etc.

Figure 17B:
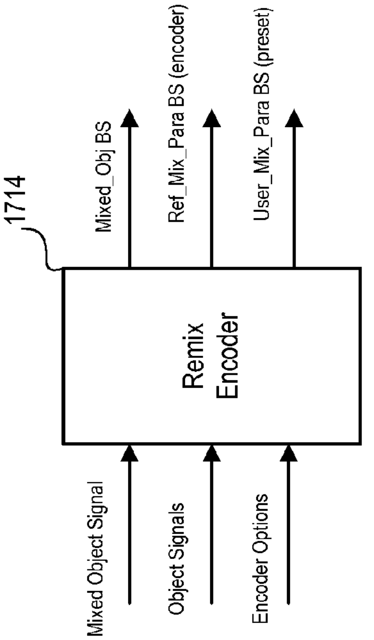
FIG. 17B illustrates an implementation of a remix encoder interface for generating bitstreams illustrated in FIG. 17A.

FIG. 17B illustrates a bitstream interface for a remix encoder 1714. In some implementations, inputs into the remix encoder interface 1714 can include a mixed object signal, individual object or source signals and encoder options. Outputs of the encoder interface 1714 can include a mixed audio signal bitstream, a bitstream including gain factors and subband powers, and a bitstream including preset mix parameters.

Figure 17C:
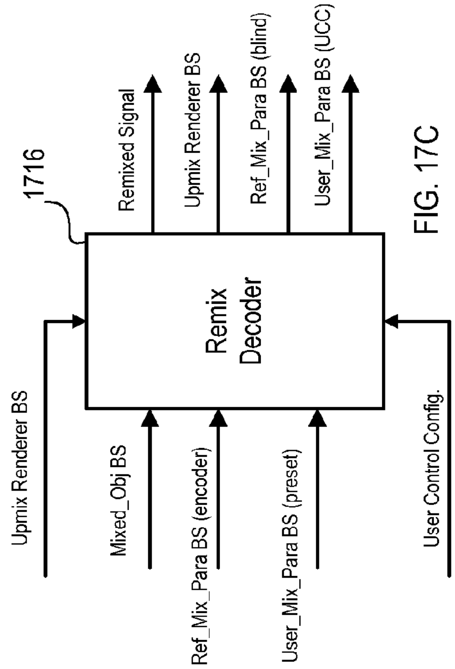
FIG. 17C illustrates an implementation of a remix decoder interface for receiving the bitstreams generated by the encoder interface illustrated in FIG. 17B.

FIG. 17C illustrates a bitstream interface for a remix decoder 1716. In some implementations, inputs into the remix decoder interface 1716 can include a mixed audio signal bitstream, a bitstream including gain factors and subband powers, and a bitstream including preset mix parameters. Outputs of the decoder interface 1716 can include a remixed audio signal, an upmix renderer bitstream (e.g., a multichannel signal), blind remix parameters, and user remix parameters.

Other configurations for encoder and decoder interfaces are possible. The interface configurations illustrated in FIGS. 17B and 17C can be used to define an Application Programming Interface (API) for allowing remix-enabled devices to process remix information. The interfaces shown illustrated in FIGS. 17B and 17C are examples, and other configurations are possible, including configurations with different numbers and types of inputs and outputs, which may be based in part on the device.

Figure 18:
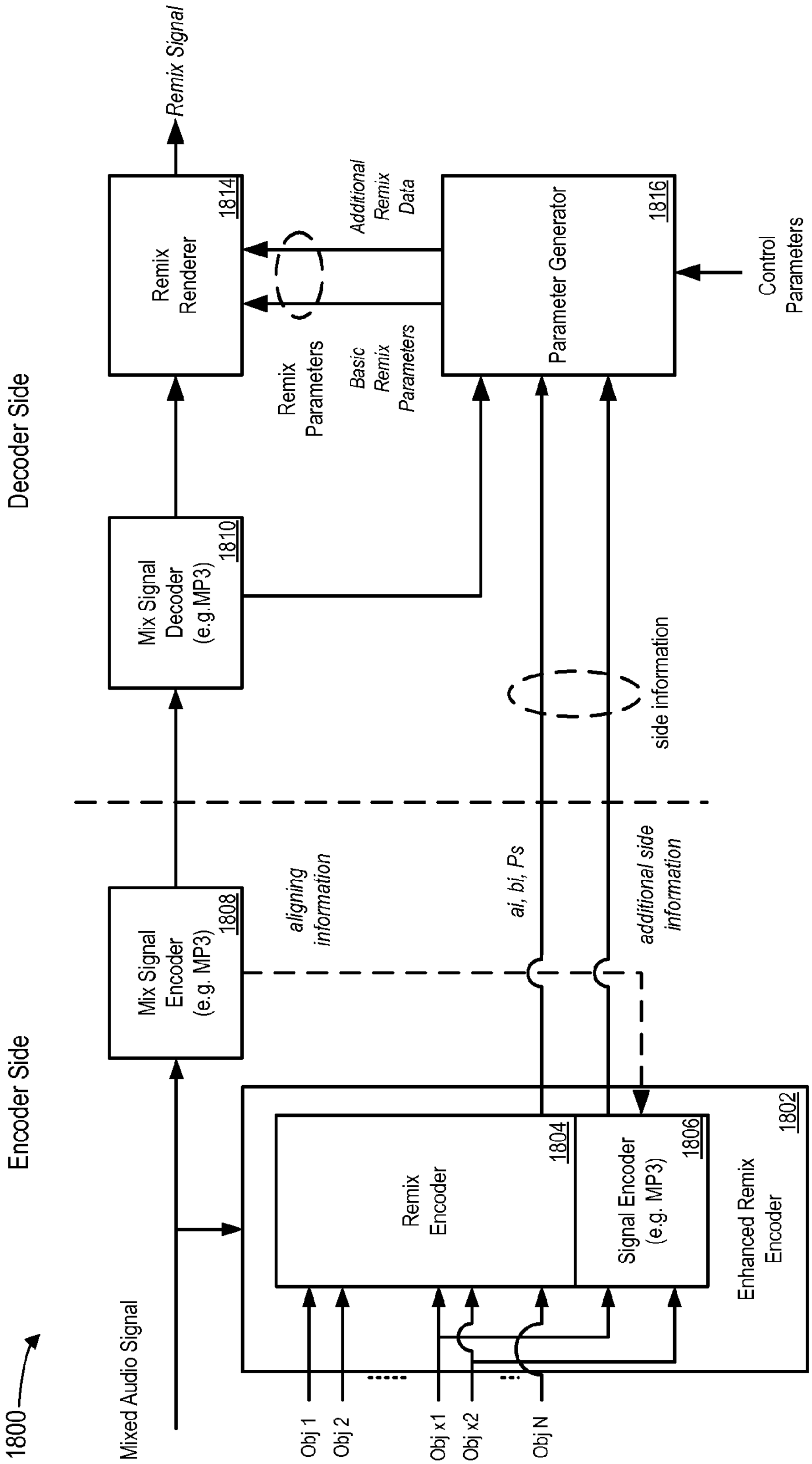
FIG. 18 is a block diagram of an implementation of a system, including extensions for generating additional side information for certain object signals to provide improved remix performance.

FIG. 18 is a block diagram showing an example system 1800 including extensions for generating additional side information for certain object signals to provide improved the perceived quality of the remixed signal. In some implementations, the system 1800 includes (on the encoding side) a mix signal encoder 1808 and an enhanced remix encoder 1802, which includes a remix encoder 1804 and a signal encoder 1806. In some implementations, the system 1800 includes (on the decoding side) a mix signal decoder 1810, a remix renderer 1814 and a parameter generator 1816.

On the encoder side, a mixed audio signal is encoded by the mix signal encoder 1808 (e.g., mp3 encoder) and sent to the decoding side. Objects signals (e.g., lead vocal, guitar, drums or other instruments) are input into the remix encoder 1804, which generates side information (e.g., gain factors and subband powers), as previously described in reference to FIGS. 1A and 3A, for example. Additionally, one or more object signals of interest are input to the signal encoder 1806 (e.g., mp3 encoder) to produce additional side information. In some implementations, aligning information is input to the signal encoder 1806 for aligning the output signals of the mix signal encoder 1808 and signal encoder 1806, respectively. Aligning information can include time alignment information, type of codex used, target bit rate, bit-allocation information or strategy, etc.

On the decoder side, the output of the mix signal encoder is input to the mix signal decoder 1810 (e.g., mp3 decoder). The output of mix signal decoder 1810 and the encoder side information (e.g., encoder generated gain factors, subband powers, additional side information) are input into the parameter generator 1816, which uses these parameters, together with control parameters (e.g., user-specified mix parameters), to generate remix parameters and additional remix data. The remix parameters and additional remix data can be used by the remix renderer 1814 to render the remixed audio signal.

The additional remix data (e.g., an object signal) is used by the remix renderer 1814 to remix a particular object in the original mix audio signal. For example, in a Karaoke application, an object signal representing a lead vocal can be used by the enhanced remix encoder 1802 to generate additional side information (e.g., an encoded object signal). This signal can be used by the parameter generator 1816 to generate additional remix data, which can be used by the remix renderer 1814 to remix the lead vocal in the original mix audio signal (e.g., suppressing or attenuating the lead vocal).

Figure 19:
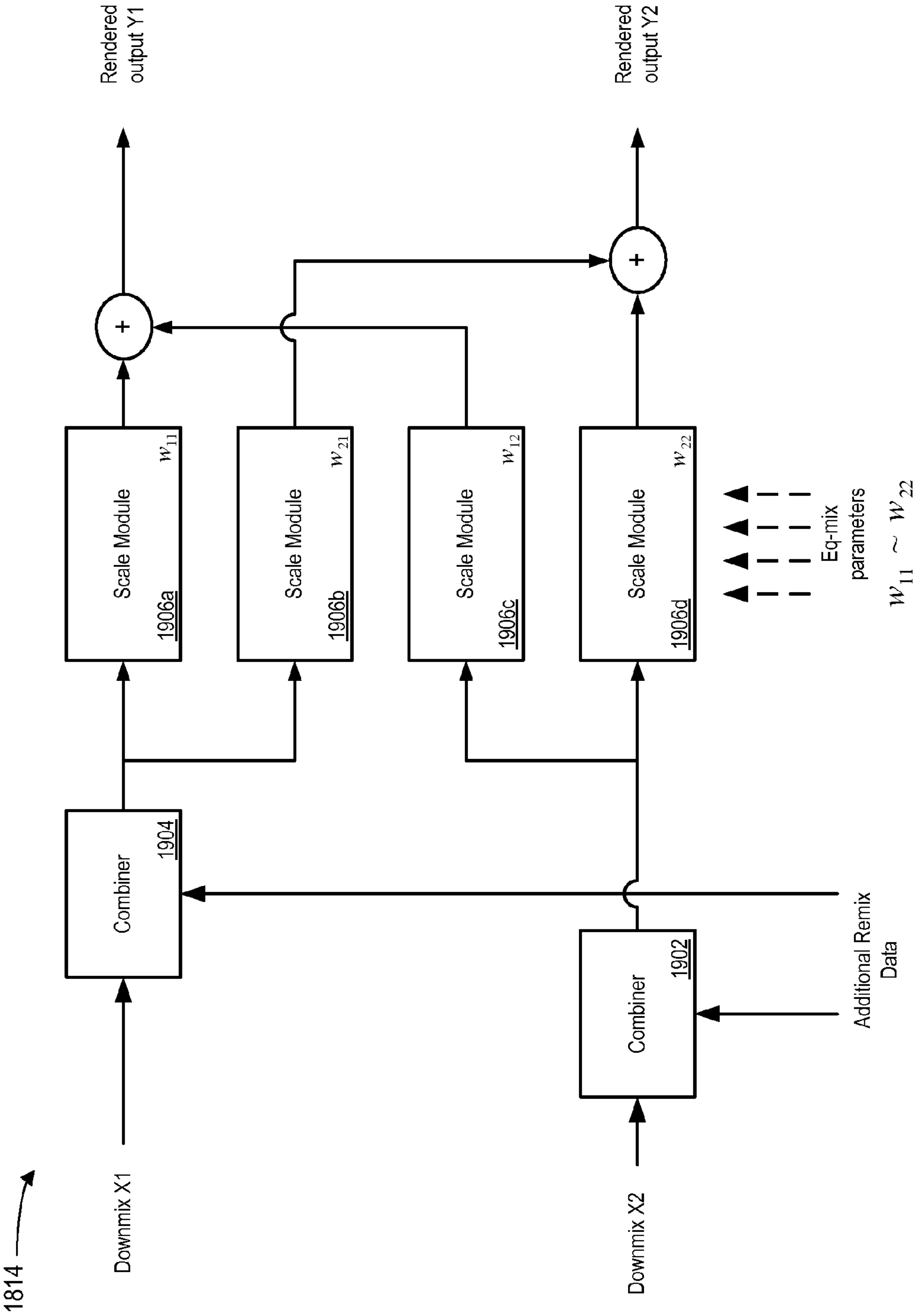
FIG. 19 is a block diagram of an implementation of the remix renderer shown in FIG. 18.

FIG. 19 is a block diagram showing an example of the remix renderer 1814 shown in FIG. 18. In some implementations, downmix signals X1, X2, are input into combiners 1904 and 1902, respectively. The downmix signals X1, X2, can be, for example, left and right channels of the original mix audio signal. The combiners 1904 and 1902 combine the downmix signals X1, X2, with additional remix data provided by the parameter generator 1816. In the Karaoke example, combining can include subtracting the lead vocal object signal from the downmix signals X1, X2, prior to remixing to attenuate or suppress the lead vocal in the remixed audio signal.

In some implementations, the downmix signal X1 (e.g., left channel of original mix audio signal) is combined with additional remix data (e.g., left channel of lead vocal object signal) and scaled by scale modules 1906*a* and 1906*b*, and the downmix signal X2 (e.g., right channel of original mix audio signal) is combined with additional remix data (e.g., right channel of lead vocal object signal) and scaled by scale modules 1906*c* and 1906*d*. The scale module 1906*a* scales the downmix signal X1 by the eq-mix parameter $w_{11}$, the scale module 1906*b* scales the downmix signal X1 by the eq-mix parameter $w_{21}$, the scale module 1906*c* scales the downmix signal X2 by the eq-mix parameter $w_{12}$ and the scale module 1906*d* scales the downmix signal X2 by the eq-mix parameter $w_{22}$. The scaling can be implemented using linear algebra, such as using an n by n (e.g., 2×2) matrix. The outputs of scale modules 1906*a* and 1906*c* are summed to provide a first rendered output signal Y2, and the scale modules 1906*b* and 1906*d* are summed to provide a second rendered output signal Y2.

In some implementations, one may implement a control (e.g., switch, slider, button) in a user interface to move between an original stereo mix, "Karaoke" mode and/or "a capella" mode. As a function of this control position, the combiner 1902 controls the linear combination between the original stereo signal and signal(s) obtained by the additional side information. For example, for Karaoke mode, the signal obtained from the additional side information can be subtracted from the stereo signal. Remix processing may be applied afterwards to remove quantization noise (in case the stereo and/or other signal were lossily coded). To partially remove vocals, only part of the signal obtained by the additional side information need be subtracted. For playing only vocals, the combiner 1902 selects the signal obtained by the additional side information. For playing the vocals with some background music, the combiner 1902 adds a scaled version of the stereo signal to the signal obtained by the additional side information.

While this specification contains many specifics, these should not be construed as limitations on the scope of what being claims or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results.

As another example, the pre-processing of side information described in Section 5A provides a lower bound on the subband power of the remixed signal to prevent negative values, which contradicts with the signal model given in [2]. However, this signal model not only implies positive power of the remixed signal, but also positive cross-products between the original stereo signals and the remixed stereo signals, namely $E\{x_1y_1\}$, $E\{x_1y_2\}$, $E\{x_2y_1\}$ and $E\{x_2y_2\}$.

Starting from the two weights case, to prevent that the cross-products $E\{x_1y_1\}$ and $E\{x_2y_2\}$ become negative, the weights, defined in [18], are limited to a certain threshold, such that they are never smaller than A dB.

Then, the cross-products are limited by considering the following conditions, where sqrt denotes square root and Q is defined as Q=10^−A/10:

If $E\{x_1y_1\}<Q*E\{x_1^2\}$, then the cross-product is limited to $E\{x_1y_1\}=Q*E\{x_1^2\}$.

If $E\{x_1, y_2\}<Q*\text{sqrt}(E\{x_1^2\}E\{x_2^2\})$, then the cross-product is limited to $E\{x_1y_2\}=Q*\text{sqrt}(E\{x_1^2\}E\{x_2^2\})$.

If $E\{x_2, y_1\}<Q*\text{sqrt}(E\{x_1^2\}E\{x_2^2\})$, then the cross-product is limited to $E\{x_2y_1\}=Q*\text{sqrt}(E\{x_1^2\}E\{x_2^2\})$.

If $E\{x_2y_2\}<Q*E\{x_2^2\}$, then the cross-product is limited to $E\{x_2y_2\}=Q*E\{x_2^2\}$.

What is claimed is:

1. A method comprising:

obtaining a first plural-channel audio signal having one or more objects;

obtaining side information, at least some of which represents a relation between the first plural-channel audio signal and the one or more objects;

obtaining a set of mix parameters; and generating a second plural-channel audio signal using the first plural-channel audio signal, the side information, and the set of mix parameters, wherein the set of mix parameters are usable to control at least one of panning and gain of the objects.

2. The method of claim 1, wherein generating a second plural-channel audio signal comprises:

decomposing the first plural-channel audio signal into a first set of subband signals;

estimating a second set of subband signals corresponding to the second plural-channel audio signal using the first set of subband signals, the side information and the set of mix parameters; and converting the second set of subband signals into the second plural-channel audio signal.

3. The method of claim 2, wherein estimating a second set of subband signals further comprises:

decoding the side information to provide gain factors and subband power estimates associated with the objects to be remixed;

determining one or more sets of weights based on the gain factors, subband power estimates and the set of mix parameters; and estimating the second set of subband signals using at least one set of weights.

4. The method of claim 3, wherein determining one or more sets of weights further comprises:

determining a set of weights that minimizes a difference between the first plural-channel audio signal and the second plural-channel audio signal.

5. The method of claim 3, wherein determining one or more sets of weights further comprises:

forming a linear equation system, wherein each equation in the system is a sum of products, and each product is formed by multiplying a subband signal with a weight; and determining the weight by solving the linear equation system.

6. The method of claim 3, further comprising:

adjusting one or more level difference cues associated with the second set of subband signals to match one or more level difference cues associated with the first set of subband signals.

7. The method of claim 3, further comprising:

limiting a subband power estimate of the second plural-channel audio signal to be greater than or equal to a threshold value below a subband power estimate of the first plural-channel audio signal.

8. The method of claim 3, further comprising:

scaling the subband power estimates by a value larger than one before using the subband power estimates to determine the one or more sets of weights.

9. The method of claim 1, wherein obtaining a set of mix parameters further comprises:

obtaining user-specified gain and pan values; and determining the set of mix parameters from the gain and pan values and the side information.

10. The method of claim 1, wherein the first plural-channel audio signal and the side information are received from the audio encoding system and the set of mix parameters is received from user input.

11. An apparatus comprising:

a decoder circuit configurable for obtaining a first plural-channel audio signal having one or more objects;

a parameter generator circuit configured to obtaining side information and for obtaining a set of mix parameters, wherein at least some of the side information represents a relation between the first plural-channel audio signal and the one or more objects; and a remix module circuit configurable for generating a second plural-channel audio signal using the first plural-channel audio signal, the side information and the set of mix parameters, wherein the set of mix parameters are usable to control at least one of panning and gain of the objects.

12. The apparatus of claim 11, wherein the first plural-channel audio signal and the side information are received from an audio encoding system and the set of mix parameters is received from user input.

13. The apparatus of claim 11, wherein the remix module is configurable for decomposing the first plural-channel audio signal into a first set of subband signals; for estimating a second set of subband signals corresponding to the second plural-channel audio signal using the first set of subband signals, the side information and the set of mix parameters; and for converting the second set of subband signals into the second plural-channel audio signal so as to generate the second plural-channel audio signal.

14. A non-transitory computer-readable medium having instructions stored thereon, which, when executed by a processor, causes the processor to perform operations, comprising:

obtaining a first plural-channel audio signal having one or more objects;

obtaining side information, at least some of which represents a relation between the first plural-channel audio signal and the one or more objects;

obtaining a set of mix parameters; and generating a second plural-channel audio signal using the first plural-channel audio signal, the side information, and the set of mix parameters, wherein the set of mix parameters are usable to control at least one of panning and gain of the objects.

15. The non-transitory computer-readable medium of claim 14, wherein generating a second plural-channel audio signal comprises:

decomposing the first plural-channel audio signal into a first set of subband signals;

estimating a second set of subband signals corresponding to the second plural-channel audio signal using the first set of subband signals, the side information and the set of mix parameters; and converting the second set of subband signals into the second plural-channel audio signal.

16. A system comprising:

a processor; and a non-transitory computer-readable medium coupled to the processor and including instructions, which, when executed by the processor, causes the processor to perform operations comprising:

obtaining a first plural-channel audio signal having one or more objects;

obtaining side information, at least some of which represents a relation between the first plural-channel audio signal and the one or more objects;

obtaining a set of mix parameters; and generating a second plural-channel audio signal using the first plural-channel audio signal, the side information, and the set of mix parameters, wherein the set of mix parameters are usable to control at least one of panning and gain of the objects.

* * * * *

UNITED STATES PATENT AND TRADEMARK OFFICE

CERTIFICATE OF CORRECTION

PATENT NO. : 8,213,641 B2
APPLICATION NO. : 11/744156
DATED : July 3, 2012
INVENTOR(S) : Faller et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1249 days.

Signed and Sealed this
Sixth Day of November, 2012

David J. Kappos
*Director of the United States Patent and Trademark Office*